United States Patent
Hettenkofer et al.

(10) Patent No.: US 9,466,026 B2
(45) Date of Patent: Oct. 11, 2016

(54) RULE ASSIGNMENTS AND TEMPLATING

(71) Applicant: Model N, Inc., Redwood Shores, CA (US)

(72) Inventors: Manfred Hettenkofer, San Francisco, CA (US); Eric Burin des Roziers, Montepellier (FR); Ketan Soni, Sunnyvale, CA (US)

(73) Assignee: Model N, Inc., Redwood Shores ( * ) Notice: Subject to any disclaimer, the term of this patent is extended or adjusted under 35 U.S.C. 154(b) by 216 days.

(21) Appl. No.: 14/106,709

(22) Filed: Dec. 13, 2013

(65) Prior Publication Data

US 2014/0180970 A1    Jun. 26, 2014

Related U.S. Application Data

(63) Continuation-in-part of application No. 14/069,362, filed on Oct. 31, 2013.

(60) Provisional application No. 61/740,816, filed on Dec. 21, 2012.

(51) Int. Cl.
*G06N 5/02* (2006.01)

(52) U.S. Cl.
CPC ..................... *G06N 5/025* (2013.01)

(58) Field of Classification Search
None
See application file for complete search history.

(56) References Cited

U.S. PATENT DOCUMENTS

| | | |
|---|---|---|
| 5,515,269 A | 5/1996 | Willis et al. |
| 5,515,524 A | 5/1996 | Lynch et al. |
| 5,576,965 A | 11/1996 | Akasaka et al. |
| 5,617,514 A | 4/1997 | Dolby et al. |
| 5,630,025 A | 5/1997 | Dolby et al. |
| 5,708,798 A | 1/1998 | Lynch et al. |
| 6,002,854 A | 12/1999 | Lynch et al. |
| 6,035,305 A | 3/2000 | Strevey et al. |
| 6,115,547 A | 9/2000 | Ghatate et al. |
| 6,188,977 B1 | 2/2001 | Hirota |
| 6,233,493 B1 | 5/2001 | Cherneff et al. |
| 6,430,730 B1 | 8/2002 | Ghatate et al. |
| 6,856,980 B2 | 2/2005 | Feldman et al. |
| 6,865,524 B1 | 3/2005 | Shah et al. |
| 6,915,253 B1 | 7/2005 | Chapman |
| 7,043,407 B2 | 5/2006 | Lynch et al. |
| 7,200,583 B1 | 4/2007 | Shah et al. |
| 7,340,409 B1 | 3/2008 | Ulwick |
| 7,433,748 B2 | 10/2008 | Selway |
| 7,483,869 B2 | 1/2009 | Kumar |
| 8,160,990 B2 | 4/2012 | Varmaraja et al. |
| 8,682,773 B1 | 3/2014 | Murphy et al. |
| 8,943,003 B2 | 1/2015 | Ardoint et al. |
| 2002/0035463 A1 | 3/2002 | Lynch et al. |
| 2002/0072956 A1 | 6/2002 | Willems et al. |

(Continued)

OTHER PUBLICATIONS

International Search Report and Written Opinion, Apr. 28, 2014, PCT/US2013/077214 (15 pages).

*Primary Examiner* — Stanley K Hill
*Assistant Examiner* — David H Kim
(74) *Attorney, Agent, or Firm* — Patent Law Works LLP

(57) ABSTRACT

Various implementations for assigning rules and creating rules using templates are described herein. In one example implementation, a model is determined, one or more components of the model are determined, a rule from a set of one or more predefined rules is determined, and the rule is assigned to the model. The rule has one or more parameters matching the one or more components of the model.

22 Claims, 19 Drawing Sheets

(56) References Cited

U.S. PATENT DOCUMENTS

| | | |
|---|---|---|
| 2002/0154114 A1 | 10/2002 | Christensen et al. |
| 2002/0169658 A1 | 11/2002 | Adler |
| 2002/0198856 A1 | 12/2002 | Feldman et al. |
| 2003/0018486 A1 | 1/2003 | Feldman et al. |
| 2004/0128117 A1 | 7/2004 | Crandall et al. |
| 2005/0090911 A1 | 4/2005 | Ingargiola et al. |
| 2005/0263594 A1 | 12/2005 | Onischu |
| 2006/0100829 A1 | 5/2006 | Lynch et al. |
| 2006/0167577 A1 | 7/2006 | Clark et al. |
| 2006/0168573 A1 | 7/2006 | Clark et al. |
| 2006/0282458 A1 | 12/2006 | Tsyganskiy et al. |
| 2007/0094060 A1 | 4/2007 | Apps et al. |
| 2007/0213968 A1 | 9/2007 | Nakagawa et al. |
| 2008/0059273 A1 | 3/2008 | Miller |
| 2009/0006301 A1 | 1/2009 | Goetsch et al. |
| 2009/0287617 A1 | 11/2009 | Schmidt |
| 2010/0121795 A1 | 5/2010 | Colena et al. |
| 2010/0161360 A1 | 6/2010 | Clement et al. |
| 2010/0262443 A1 | 10/2010 | D'Albis et al. |
| 2011/0173050 A1 | 7/2011 | Heyns et al. |
| 2012/0005144 A1 | 1/2012 | Cutler et al. |
| 2012/0166459 A1 | 6/2012 | Ritter et al. |
| 2012/0198368 A1 | 8/2012 | Bornheimer et al. |
| 2013/0110473 A1 | 5/2013 | Cantu |
| 2014/0096041 A1* | 4/2014 | Gowen .......... G06F 3/0484 715/753 |

* cited by examiner

1800

Receive revision(s) to model
1802

Revise model using revision(s)
1804

Determine one or more rules as no longer matching one or more corresponding aspects of model based on revision(s)
1806

Remove non-matching rule(s) from model
1808

Generate notification describing removal of non-matching rule(s) from model
1810

Provide notification to user
1812

RULE ASSIGNMENTS AND TEMPLATING

CROSS-REFERENCE TO RELATED APPLICATIONS

The present application claims priority under 35 U.S.C. §120 to U.S. patent application Ser. No. 14/069,362, filed Oct. 31, 2013, and titled "Simplified Product Configuration Using Table-Based Rules, Rule Conflict Resolution Through Voting, and Efficient Model Compilation", which claims the benefit under 35 U.S.C. §119(e) of U.S. Provisional Application No. 61/740,816, filed on Dec. 21, 2012, and titled "Nimbus Configurator Architecture", the entire contents of each of which are incorporated herein by reference.

BACKGROUND

The present disclosure relates to rule assignments and rule definition using templates.

Product configuration technologies are frequently used to customize complex products to meet the needs of individual customers. However, some existing technologies do not provide an efficient way for creating and maintaining rules for configuring products. The rule creation and maintenance solutions provided by these technologies can be very complex, and as a result, companies are forced to provide expensive training or hire personnel with specialized technical skills that allow them to understand how to both create and maintain the rules. For instance, these technologies fail to provide a simplified mechanism for defining complex modeling rules, and instead require even entry-level users to define all aspects of a rule using complicated software code, Boolean logic, and formulas, which they are often unable or less effective at doing.

Furthermore, the some existing technologies do not provide product modelers with appropriate resources to determine which rules are applicable to a specific product. As such, modelers often forget to apply rules that are necessary or needlessly waste time creating redundant rules. These drawbacks can result in a frustrating user experience for modelers and make the modeling process inefficient and time consuming.

SUMMARY

According to one innovative aspect of the subject matter described in this disclosure, a system includes one or more processors and a modeling engine. The modeling engine is executable by the one or more processors to perform various acts. For instance, the modeling engine determines a model, determines one or more components of the model, determines a rule from a set of one or more predefined rules, and assigns the rule to the model. The rule has one or more parameters matching the one or more components of the model.

In general, another innovative aspect of the subject matter described in this disclosure may be embodied in methods that include determining a model; determining one or more components of the model; determining a rule from a set of one or more predefined rules, the rule having one or more parameters matching the one or more components of the model; and assigning the rule to the model.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include matching the one or more components of the model to one or more attributes, option groups, and products; determining the rule based on the matching; overriding the rule that is assigned to the model by assigning the rule differently to the model or assigning another rule to the model; providing a rule definition interface including the assignment of the rule to the model for presentation to a user; receiving an input from the user to override the assignment of the rule; that determining the rule from the set of one or more predefined rules includes automatically determining the rule based on a common attribute between the rule and the model; determining an option group associated with the model; determining that the option group includes a product; determining that the rule is dependent on the product; that the rule is assigned to the model based on the rule being dependent on the product; determining an option group associated with the model; determining that the option group is associated with an attribute; determining that the rule is dependent on the attribute; that the rule is assigned to the model based on the rule being dependent on the attribute; determining an option group associated with the model is user-defined; determining an attribute tied to an option of the option group; determining a rule is dependent on the attribute tied to the option of the option group; and that the rule is assigned to the model based on the rule being dependent on the attribute.

For instance, the features may include that the rule includes the one or more attributes, option groups, and products, and the one or more attributes, option groups, and products correspond to the one or more components of the model; and that the common attribute includes an option group, attribute, or product, and the model and the rule each includes the option group, attribute, or product.

According to yet another innovative aspect of the subject matter described in this disclosure, a system includes one or more processors and a modeling engine. The modeling engine is executable by the one or more processors to perform certain acts. The modeling engine receives an input from a first user to create a rule template for a rule; provides a table-based rule definition interface for presentation to the first user; receives an input defining a first set of one or more columns of a table as a rule condition for the rule; receives an input defining a second set of one or more columns of the table as a rule action for the rule; stores the table including the first set of one or more columns and the second set of one or more columns as the rule template in a data store; provides the table-based rule definition interface including the rule template to a second user; receives an input from the second user defining a row for the table reflecting an expression of the rule; and updates the table with the row.

In general, yet another innovative aspect of the subject matter described in this disclosure may be embodied in methods that include receiving an input from a first user to create a rule template for a rule; providing a table-based rule definition interface for presentation to the first user; receiving an input defining a first set of one or more columns of a table as a rule condition for the rule; receiving an input defining a second set of one or more columns of the table as a rule action for the rule; storing the table including the first set of one or more columns and the second set of one or more columns as the rule template in a data store; providing the table-based rule definition interface including the rule template to a second user; receiving an input from the second user defining a row for the table reflecting an expression of the rule; and updating the table with the row.

These and other implementations may each optionally further include one or more of the following features. For instance, the features may further include that the one or more columns representing the rule condition and the one or more columns representing the rule action each include one of a category, an option group, an attribute type, and a quantity and the expression of the rule input by the second user includes a value for each of the one or more columns representing the rule condition and for each of the one or more columns representing the rule action.

It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

The technology discussed in this application splits rule maintenance into a two-phase process. In the first phase, to create a rule, the technology creates a rule template in the form of a table structure based on input from a modeler defining columns that represent the condition and action for the rule. These columns will later be populated with values that trigger the rule action based on the satisfaction of the rule condition. In the second phase, a product owner can enter specific rule expressions into the table. The expressions include the values that determine when the rule action is triggered. Dividing the rule maintenance into these two distinctive phases allows the framework of the rule to be created independently from the specific conditions that trigger the rule. The advantage of this approach is that less sophisticated users can fill out the rule conditions and the advanced modelers can build the rule structure. As a result, the advanced modeler does not need to write the rule in its entirety, but can instead shift the responsibility for entering the rule conditions to a person who has a more limited knowledge about model maintenance.

The technology also provides a mechanism that helps modelers to decide if a general rule is applicable to a specific model. Rules can be globally defined, which means that they could apply to multiple models. When an administrator maintains a model, at one point he or she might need to assign rules to that model. The technology can automatically compare the rule parameters with the options and attributes used in the model and indicate to the user whether a rule applies to his or her model. This increases the likelihood that the modeler make a fully functional model because the system helps the user to not forget rules and be more efficient by re-using existing rules instead of creating redundant rules.

Figure 1:
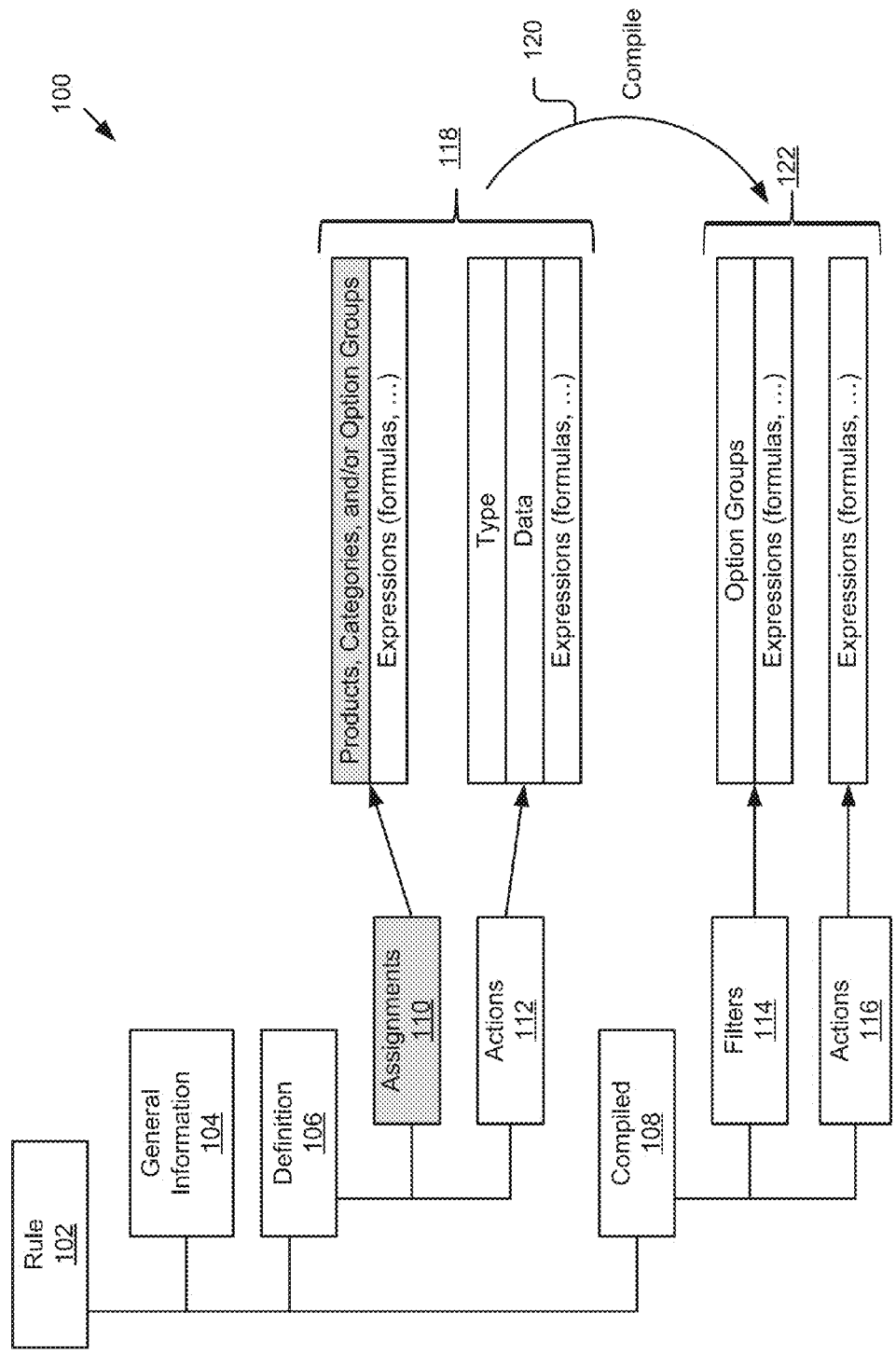
FIG. 1 is a block diagram illustrating an example architecture for a rule.

FIG. 1 is a block diagram illustrating an example architecture 100 for a rule 102. As depicted, the rule 102 may include at least general information 104, a definition 106, and a compiled code 108. The general information 104 may include information about the rule, such as, but not limited to, its name, description, id, lifecycle status, effective dates, creator, revision history, etc. The definition 106 may include a simplified representational view of the rule and that can be used to describe the rule in a user interface generatable by the technology described herein to view and/or edit the rule. The definition 106 may represent a structured way to create a rule based on one or more elements including predefined assignments 110 and actions 112.

The assignments 110 may be defined by the rule 102 and may determine when a rule is executed. The assignments 110 can associate the rule 102 with various types of objects including, but not limited to, products, categories, and option groups as depicted in association with reference number 118. Rule assignments 110 can be user defined (e.g., be explicit rule assignments) and/or automatically defined by system (e.g., be implicit rule assignments). Rule assignments 110 and/or actions 112 may be defined using one or more expressions, which may include various values, functions, variables, etc. In some implementations, rules can be assigned to various types of objects including attributes, products, and option groups, etc. If a rule has no assignment, the modeling engine 920 (e.g., see FIG. 9) may determine one or more option groups it could impact based on the action. For instance, compatibility between attr1 and attr2 action could create an implicit assignment with option groups that have a tie to one of these attributes.

Actions 112 may determine what the rule does when it is executed. Actions 112 can be categorized into different action types (also referred to as rule types). For each action type, the technology may provide users with an associated user interface for defining that rule using a structured data model (e.g., for storage and UI behavior) that may be compiled into compiled code 108 and interpreted. Example action/rule types include compatibility, conditionally required, conditionality visible, default selected options, option entitlement, price adjustment, raw, etc.

The assignments 110 and actions 112 may be compiled 120 into corresponding filters 114 and actions 116. The filters 114 of a rule 102 may determine the conditions for executing a rule and the actions 116 of a rule may determine what the rule 102 does when it is executed. Within a rule, one or more actions can be added by the user (e.g., actions 112) or autonomously by the modeling engine 920 in cooperation with the configuration engine 926 (See FIG. 9). As depicted, a filter 114 may include one or more option group, and may trigger the execution of the rule 102 if the option group has changed. The filter 114 may also include an expression (e.g., Boolean expression) that determines whether the rule should be executed.

Figure 2:
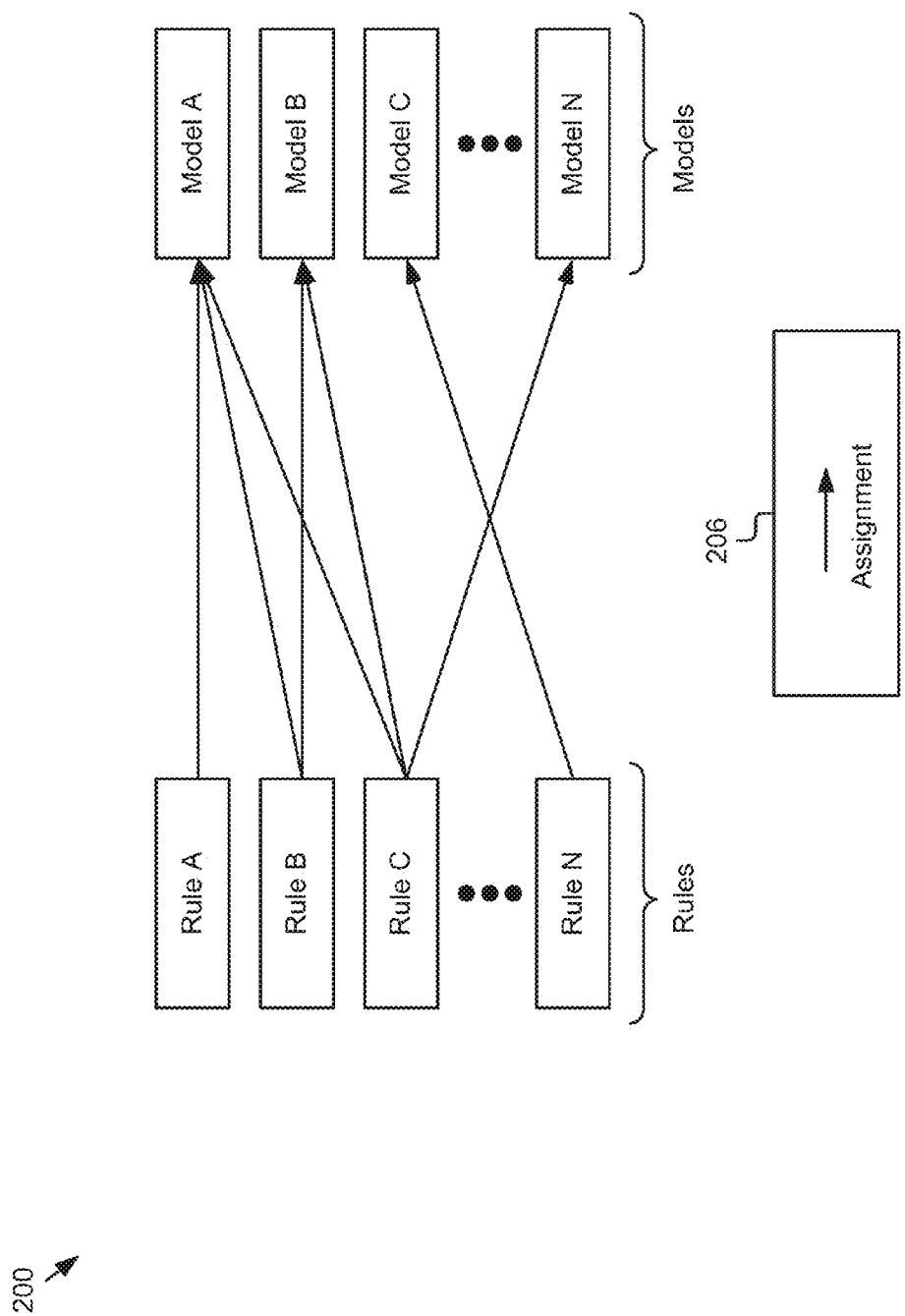
FIG. 2 is a block diagram of an example mapping depicting one to one, one to many, and many to one assignment relationships.

FIG. 2 is a block diagram of an example mapping 200 depicting one-to-one, one-to-many, and many-to-one assignment relationships of rules to models. The example mapping 200 includes a plurality of rules A . . . N and models A . . . N. The example mapping 200 illustrates different types of relationships by which one or more rules can be assigned to a model. The rules may be assigned explicitly by a user (e.g., via an explicit rule assignment) or implicitly by the system (e.g., via an implicit rule assignment). In some implementations, a user may have an option to override the rule assignment implicitly determined by the system.

In the example shown in FIG. 2, rule A is assigned to model A and rule N is assigned to model C. These assignments are one-to-one, rule to model assignment relationships. In addition, Rule B is assigned to model A and model B, and rule C is assigned to model A, model B, and model N. These assignments are one-to-many assignment relationships (one being the rule and many being the models). Further, Rule A, rule B, and rule C are assigned to the same model A and rule B and rule C are assigned to the same model B. These assignments are many-to-one assignment relationships (many being the rules and one being the model). Each arrow 206 reflects an assignment. It should be understood that the assignment relationships are not limited to the types shown in the example mapping 200 and that other types of assignment relationships are also possible and are within the scope of the present disclosure including, for example, many-to-many assignment relationships, etc. Additional description of assignments, including implicit and explicit assignments, as well as the overriding of assignments, is provided elsewhere herein, for example, with reference to at least FIG. 4.

Figure 3:
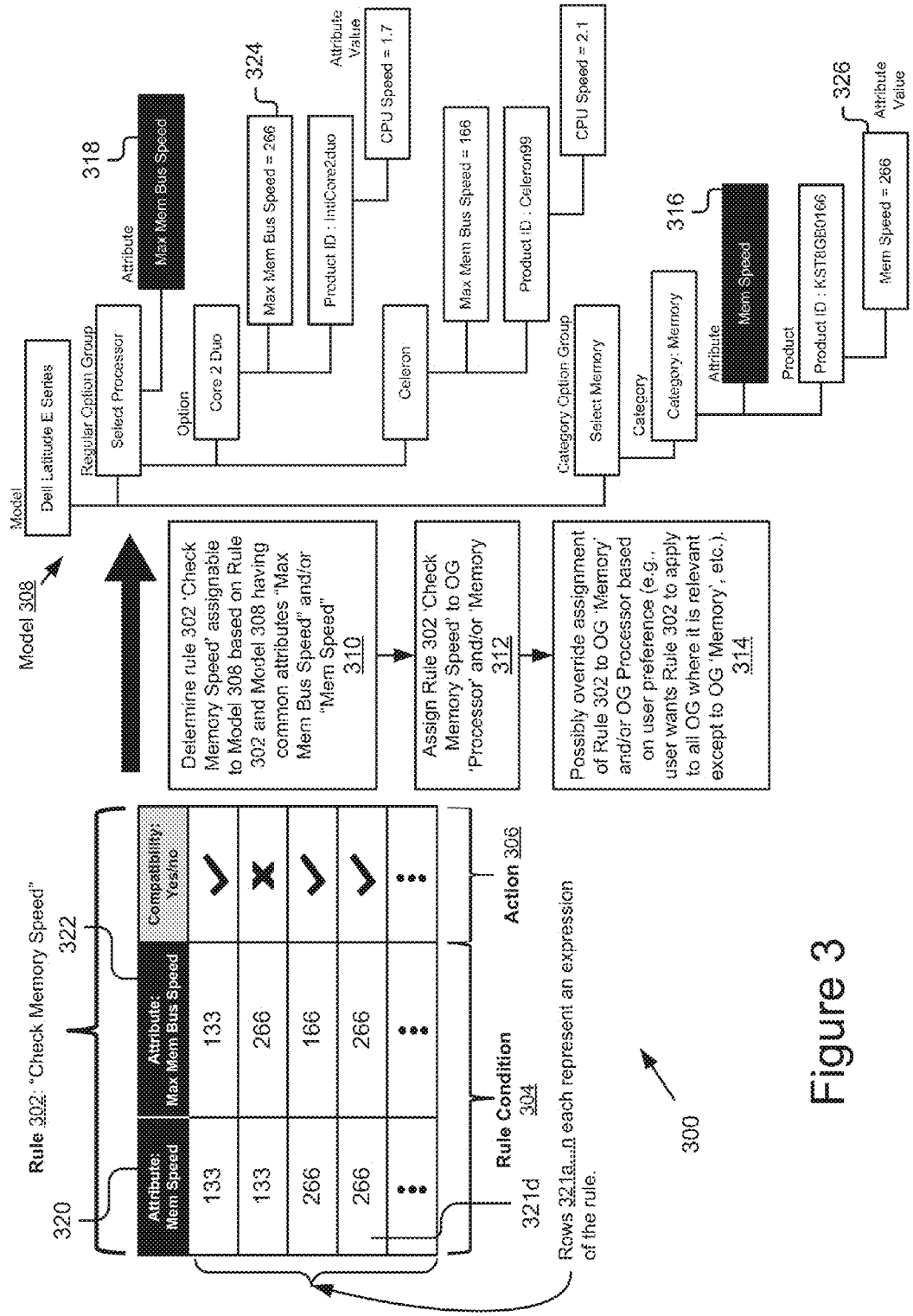
FIG. 3 is a block diagram illustrating an example method for automatically assigning a rule to a model based on common aspects and overriding the assignment based on user preference in some cases.

FIG. 3 is a block diagram illustrating an example method 300 for automatically assigning a rule to a model based on common aspects and overriding the assignment based on user preference in some cases. For instance, if the rule and model include a common attribute (e.g., the same option group, attribute, or product), then the rule assignment engine 1026 (see FIG. 10B) can automatically assign the rule to the model. Via the rule assignment engine 1026, a user can also override the rule that is automatically assigned to the model by assigning the rule differently to the model or assigning another rule to the model. For example, if a rule was already assigned to a model and a new option group was added, the user may want to assign that rule to the newly added option group.

In particular, FIG. 3 includes a rule 302, namely "Check Memory Speed", and a model 308, namely "Dell Latitude E Series". The rule 302 includes columns "Attribute: Mem Speed" 320 and "Attribute: Max Mem Bus Speed" 322 as rule condition 304 and column "Compatibility: Yes/No" as action 306. Rows 321a . . . n represent rule expressions including attributes and compatibility values for the rule condition 304 and action 306, respectively.

The model 308, as depicted, includes regular option group and category option group. The regular option group includes options and attributes with corresponding attribute values. The category option group includes a category that has an attribute and a product with corresponding attribute value. As depicted, the rule 302 and the model 308 have common attributes as shown to be highlighted by reference numerals 316, 318, 320, and 322, respectively. For instance, the rule 302 has attributes 320 and 322 and the model 308 has attributes 316 and 318 in common. By way of example, row/expression 321d of the rule 302 reads: if "Attribute: Mem Speed=266" and "Attribute: Max Mem Bus Speed=266", then "Compatibility: Yes". Using this example, since the model 308 also includes the "Max Mem Bus Speed=266" and "Mem Speed=266" as indicated by reference numerals 324 and 326, respectively, the rule assignment module 1026 can automatically assign the rule 302 to the model 308 based on these common attributes and their corresponding common values.

The example method 300 illustrates how the rule can automatically be assigned to various aspects of the model and overridden based on user preference. In the depicted implementation, the method determines in block 310 that the rule 302 "Check Memory Speed" is assignable to the model 308 based on the rule 302 and the model 308 having the common attributes "Max Mem Bus Speed" and "Mem Speed", as indicated by reference numerals 316, 318, 320, and 322. Upon determining that the rule 302 is assignable to the model 308 in block 310, the method assigns 312 the rule 302 "Check Memory Speed" to regular option group "Processor" and category "Memory" of the model 308 since they include attributes matching the attributes 320 and 322 of the rule 302. In some implementations, a user may possibly 314 override this assignment based on his or her preference. For example, a user may want to apply the rule 302 to all options groups where it is relevant except to the option group "Memory", as assigned in block 312.

In some implementations, the UI engine 1020 can provide a rule definition interface including the assignment of the rule to the model for presentation to a user and the user can provide an input indicating he or she wants to override the rule assignment. The rule assignment engine 1026 can receive the input from the user requesting to override the assignment of the rule and carry out the override request.

Figure 4:
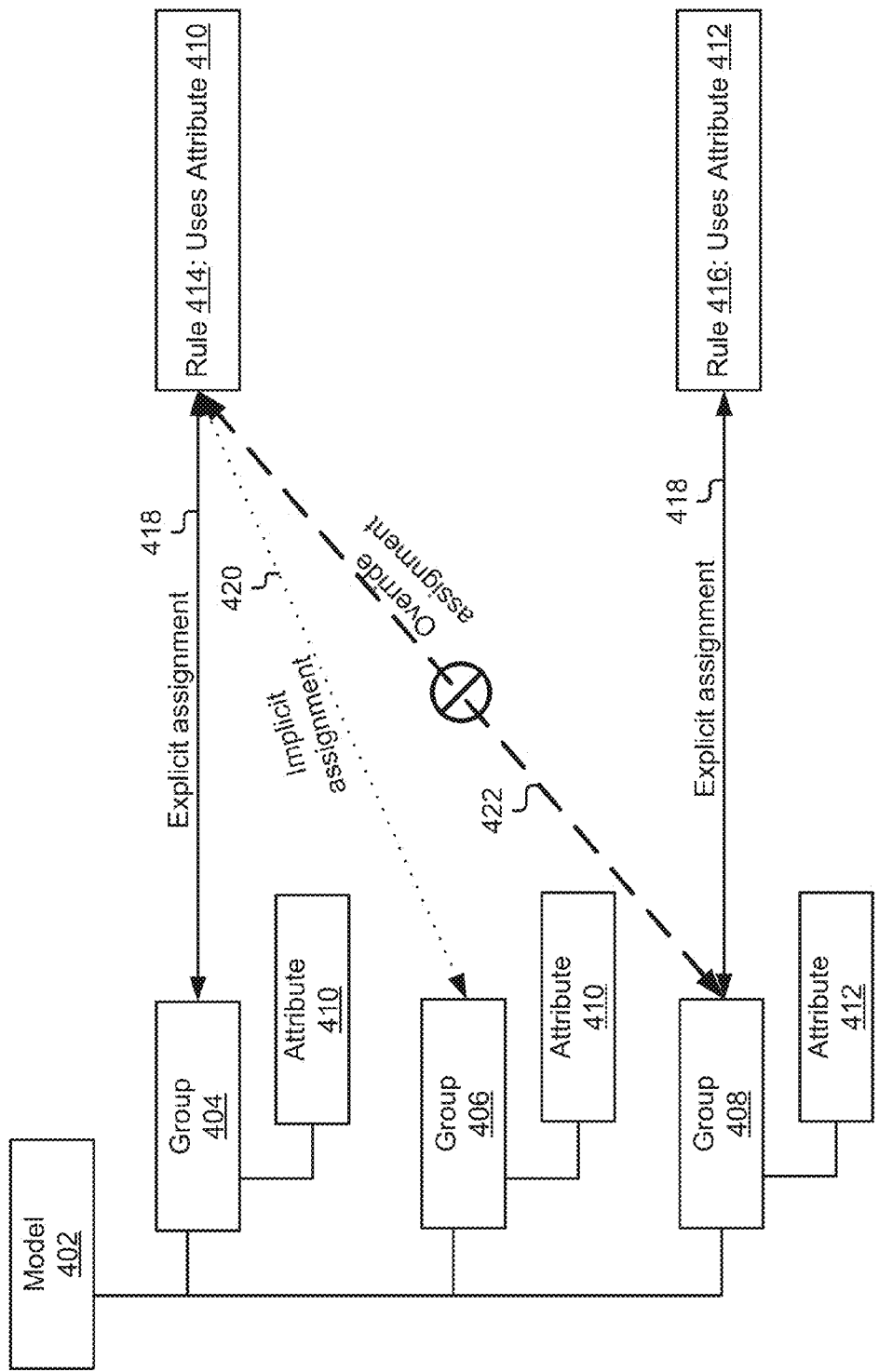
FIG. 4 is a block diagram showing example explicit and implicit assignments, and an example override of an automatically determined assignment.

FIG. 4 is a block diagram showing example explicit and implicit assignments, and an example override of an automatically determined assignment. FIG. 4 includes a model 402 having three option groups, namely Group 404, Group 406, and Group 408. Each group includes an attribute. For example, Group 404 and Group 406 include Attribute 410, and Group 408 includes Attribute 412. As depicted, the example 400 includes two rules, namely Rule 414 that uses Attribute 410 and Rule 416 that uses Attribute 412.

Since rule 414 and group 404 both have attribute 410 in common, a user can explicitly assign the rule 414 to the group 404 as indicated by solid line 418. In some instances, this assignment can also be done implicitly by the rule assignment engine 1026. Since group 406 also includes attribute 410 and even though the user did not explicitly assign the rule 414 to this group, the rule assignment engine 1026 can automatically determine the common attribute (attribute 410) between the group 406 and the rule 414 and can automatically (implicitly) assign the rule 414 to the group 406 as indicated by dotted line 420. In some implementations, a user may have the option to override a rule assignment that is determined implicitly by the rule assignment engine 1026 based on the common aspect (e.g., attribute). For example, a user can explicitly override, via the rule assignment engine 1026, the rule 414 by un-assigning the rule 414 from group 406.

In a similar manner, since rule 416 and Group 408 have attribute 412 in common, a user can explicitly assign the rule 416 to the group 408 as indicated by solid line 418. In some instances, a user can override a rule assignment to a model. For example, as depicted in FIG. 4, the user may override the implicit assignment 422 that automatically assigns Rule 414 to Group 408 by removing the assignment via an associated user interface. In an alternative example, assume that Group 408 and rule 414 do not have attributes in common and that no implicit assignment was automatically made by the rule assignment engine 1026. In this case, a user could override the non-association of Rule 414 and Group 408 by explicitly assigning the rule 414 to the Group 408 as indicated by dashed line 422 via an associated user interface. While attributes are used in this example as the basis of creating assignments, it should be understood that in some cases an assignment may be created where no common aspects between the rule and model exist. Further, it should be understood that assignments could be based on other parameters, such as option groups, options, products, etc.

Figure 5:
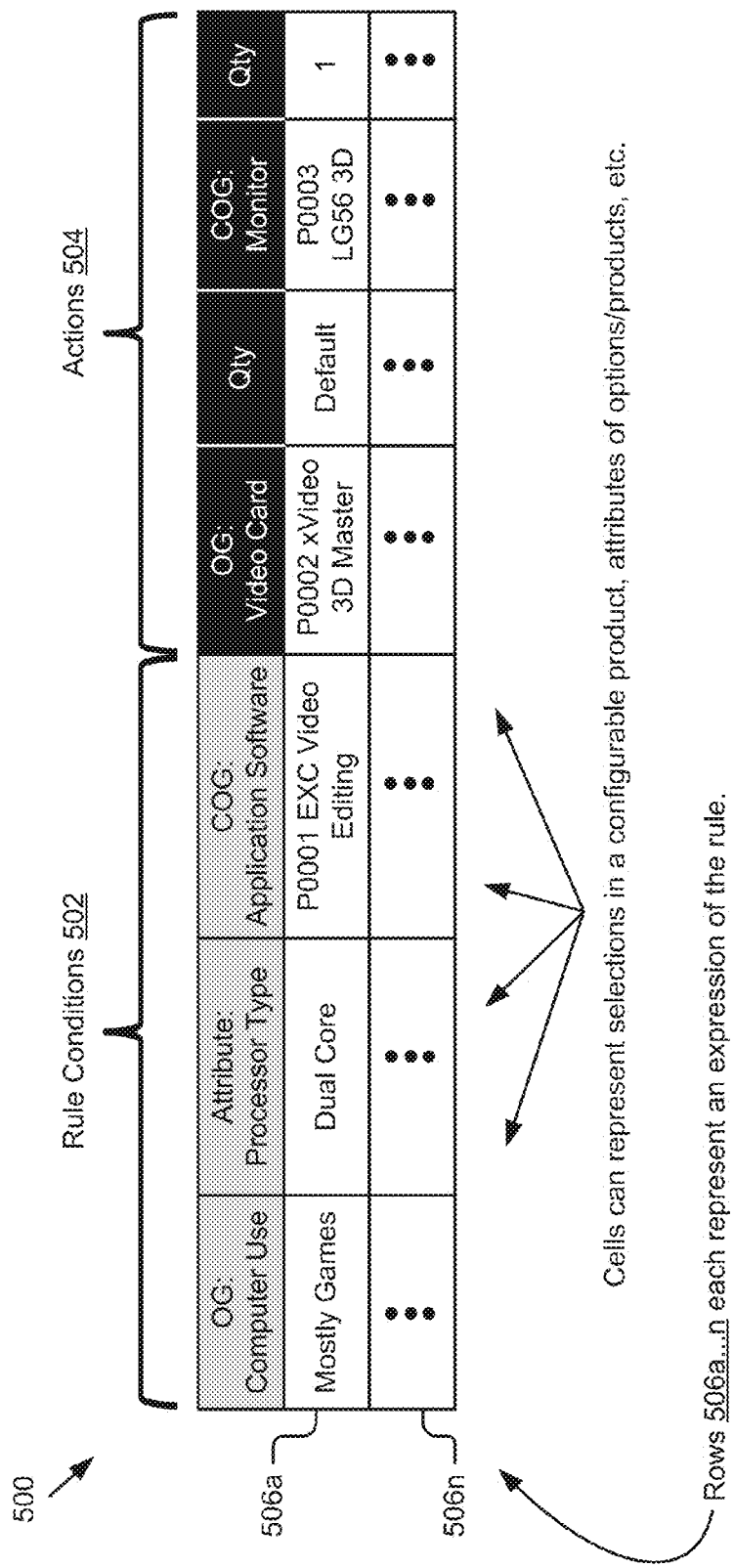
FIG. 5 illustrates an example multi-dimensional rule table.

FIG. 5 illustrates an example multi-dimensional rule table 500. As depicted, the first set 502 of columns in the rule table 500 represents the rule condition (e.g., "IF") portion of the rule defining when the rule applies and the second set 504 of one or more columns represent the rule action (e.g., "THEN") portion of the rule defining the result of the rule. If more than one column is included in the first set, the conditions are treated as a logical conjunction, meaning that the rule applies if and only if all conditions are true (i.e. "AND" operator). Since more than one column is included in the first set in this example, the Option Group "Computer Use", Attribute "Processor Type", and Category Option Group "Application Software" all must match for the rule to apply.

In particular, the first set of columns 502 includes possible selections (e.g., options, products, categories, attributes, etc.) for a configurable product, attributes of options/products, etc. and the second set of columns 504 represents items and quantities that are to be used if the rule condition of the first set 502 of columns is satisfied. In this example, the OG (option group) columns describe one or more valid option groups; the COG (category option group) columns describe one or more valid product IDs; the attribute column describes a valid attribute value; and the qty columns describe a valid quantity. In some instances, default values may be used in the rule expressions. For instance, the quantity may default to a specific value (e.g., 1), but can be any non-zero value. The rule conditions may include expressions that represent an operator and value. In the example, Attribute "Processor Type" with a value of "Dual Core" implicitly means that the Attribute "Processor Type" equals the value "Dual Core". However, other operators may be used, such as contains (e.g. "Processor Type" contains the string "Core") or greater than (e.g. "Memory Speed" greater than 233), etc.

While various examples discussed herein are discussed within the context of a rule being expressed in form of an 'IF' (rule condition) clause and a 'then' (rule action) clause, it is not limited to such and other rule condition and action types are contemplated and fall within the scope of this disclosure.

Each row 506a . . . n of the rule table 500 represents an expression (e.g., values, variables, text, etc.) of the rule including appropriate values for the rule conditions 502 and actions 504. Using the example in FIG. 5, the expression 502a of the rule embodied by the rule table 500 could read: IF OG:Computer Use="Mostly Games" AND Attribute: Processor Type="Dual Core" AND COG:Application Software="P0001 EXC Video Editing", THEN select OG:Video Card="P0002 xVideo 3D Master" with Qty="Default" AND COG:Monitor="P0003LG56 3D" with Qty="1".

Figure 6:
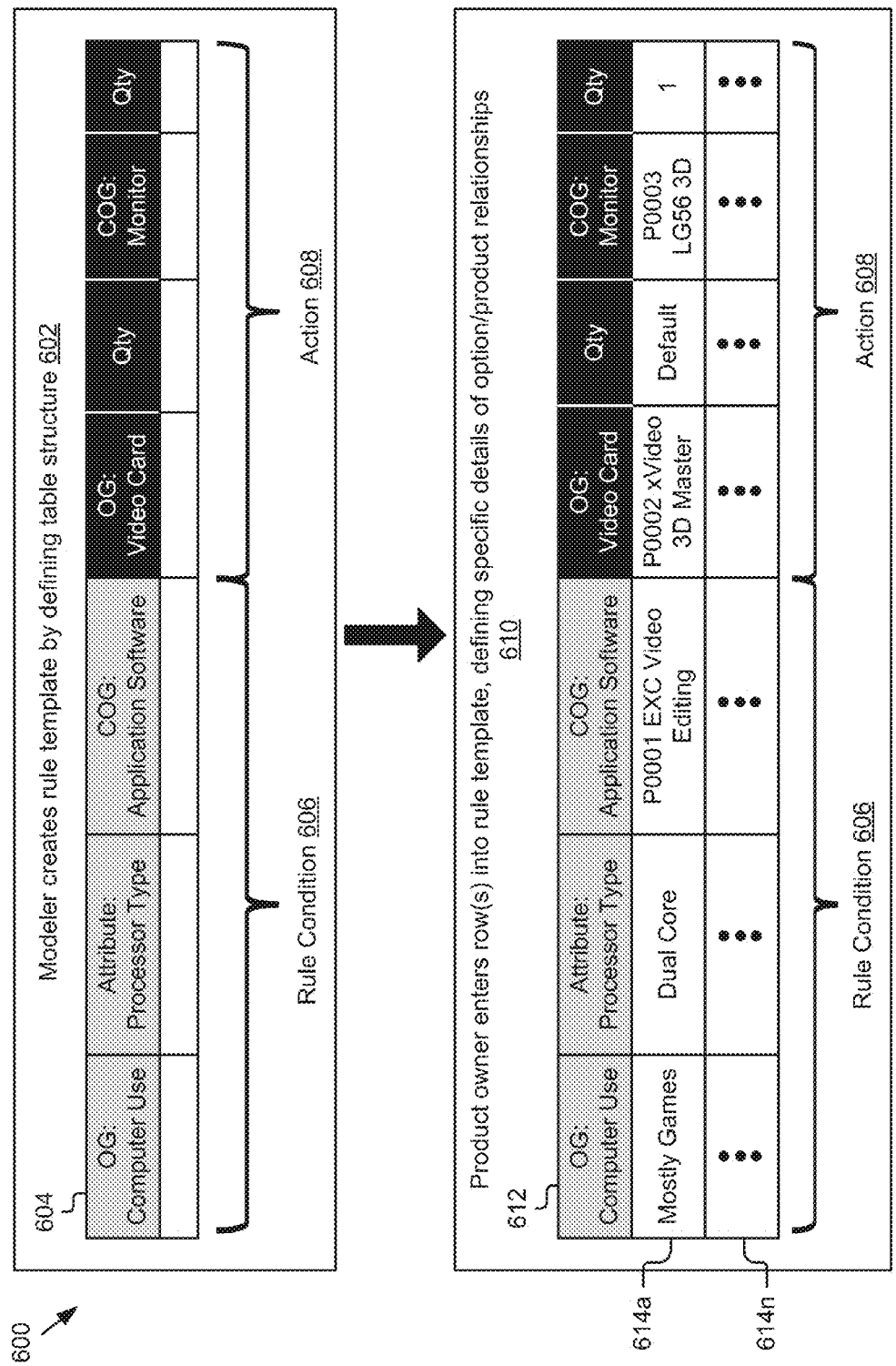
FIG. 6 is a block diagram illustrating an example rule creation process using a multi-dimensional table.

FIG. 6 is a block diagram illustrating an example rule creation process 600 using a multi-dimensional table. In a first phase 602, the process 600 enables a modeler to create a rule template by providing input defining a table structure 604. The table structure 604 may be generated by adding one or more columns for rule condition 606 and adding one or more columns for rule action 608, as specified by the modeler.

Each column in the table structure may represent a dimension of either the rule condition or the rule action. In particular, as shown in the figure, the table structure may include three columns: "OG: Computer Use", "Attribute: Processor Type", and "COG: Application Software", which form the rule condition 606. The table structure may include four columns: "OG: Video Card", "Qty", "COG: Monitor", and "Qty", which form the rule action 608.

Once the modeler has created the rule template by defining the table structure 604 in the first phase 602, the rule template may be provided to another user in a second phase 610, so that user can enter rows into the table representing expression of the rule embodied by the rule template. For instance, a product owner may enter one or more rows 614a . . . n into the rule template defining specific details of option/product relationships. Each row 614a . . . n includes values (e.g., numbers, variables, text, etc.) in the cells corresponding to the rule condition 606 and the rule action 608.

By way of example, the product owner may enter values in the row 614a as "Mostly Games", "Dual Core", "P0001 EXC Video Editing", "P0002 xVideo 3D Master", "Default", "P0003LG56 3D", and "1" for columns "OG: Computer Use", "Attribute: Processor Type", "COG: Application Software", "OG: Video Card", "Qty: Default", "COG: Monitor", and "Qty", respectively. As a result, the rule expression 614a can be interpreted by the rule creation engine 1024 (e.g., see FIG. 10B) as IF OG:Computer Use="Mostly Games" AND Attribute:Processor Type="Dual Core" AND COG:Application Software="P0001 EXC Video Editing", THEN select OG:Video Card ="P0002 xVideo 3D Master" with Qty="Default" AND COG:Monitor="P0003LG56 3D" with Qty="1".

Figure 7:
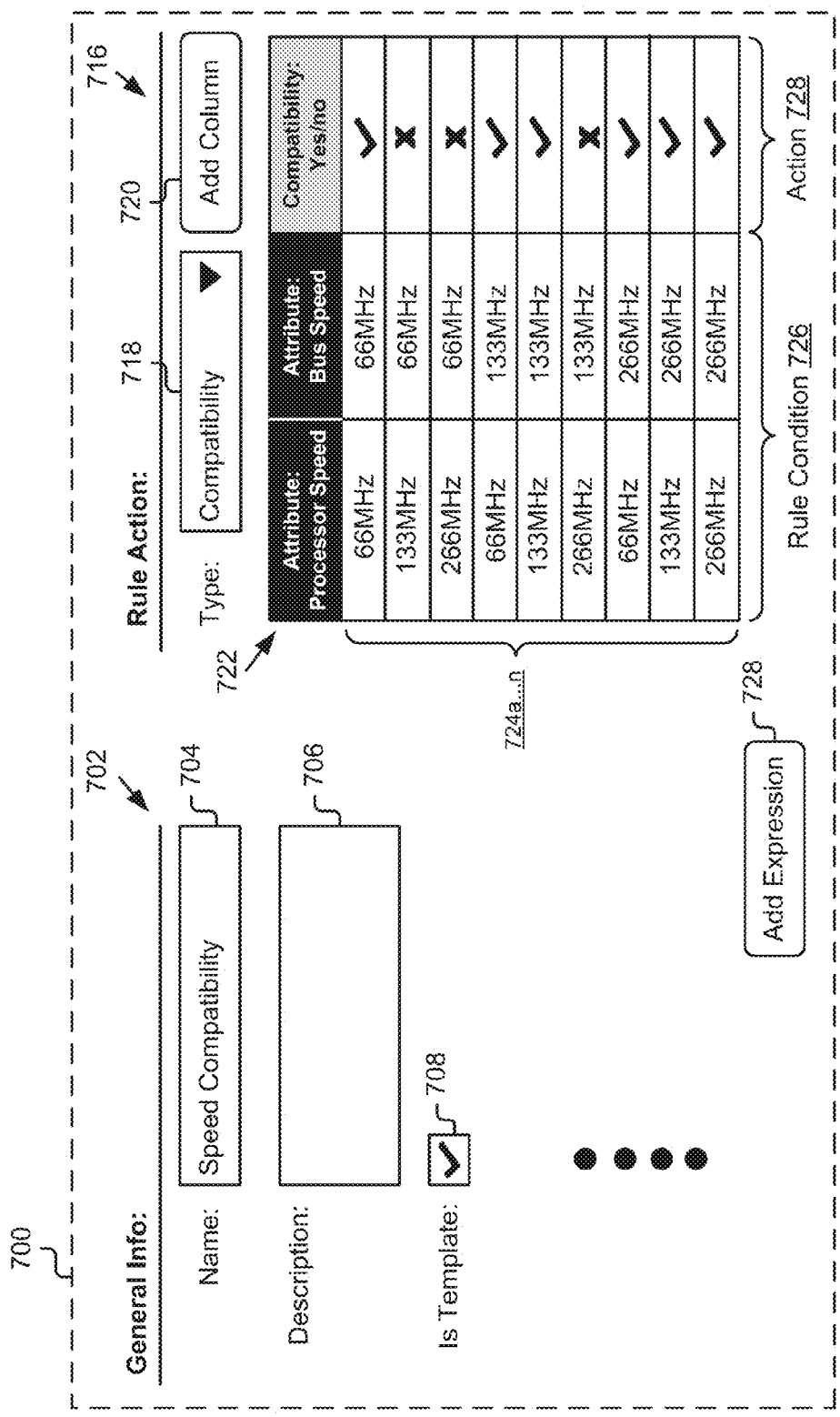
FIG. 7 is a graphical representation of an example rule definition interface.

FIG. 7 is a graphical representation of an example rule definition interface 700. As depicted, the interface 700 includes an area 702 for entering general information for a rule and an area 716 for defining a rule action based on a rule condition using a multi-dimensional table. In some implementations, the interface 700 may be generated by the rule creation engine 1024 and provided for display in cooperation with the UI engine 1020.

The general information area 702 includes a name box 704 for entering a name for a rule, a description box 706 for entering a brief description for the rule, and a checkbox 708 for declaring whether the rule is a template or not. Checking the checkbox 708 to declare a rule as a template instructs the rule creation engine 1024 to create, in association with the rule assignment engine 1026, a link (assignment) from one or more products or product categories to that rule so when such a product is being configured by a product owner, the rule template will be identified as associated with the product by the rule creation engine 1024 and provided to the product owner so the product owner can customize the rule reflected by the template (e.g., by changing the values in existing rows and/or entering additional rows/values reflecting expressions of the rule).

The rule action area 716 includes a dropdown menu 718 for selecting a type of rule that is being created, an add column box 720 for adding one or more columns in rule table 722, and the rule table 722 containing one or more columns as the rule condition 726 and one or more columns as the rule action 728. For example, as depicted in the figure, the rule table 722 includes columns "Attribute: Processor Speed" and "Attribute: Bus Speed" as the rule condition 726 and column "Compatibility: Yes/No" as the rule action 728. The rows/expressions are indicated by reference numeral 724$a$ . . . $n$. The interface 700 also includes an "Add Expression" button 728 for adding one or more rows/expressions 724 into the rule table 722.

Figure 8:
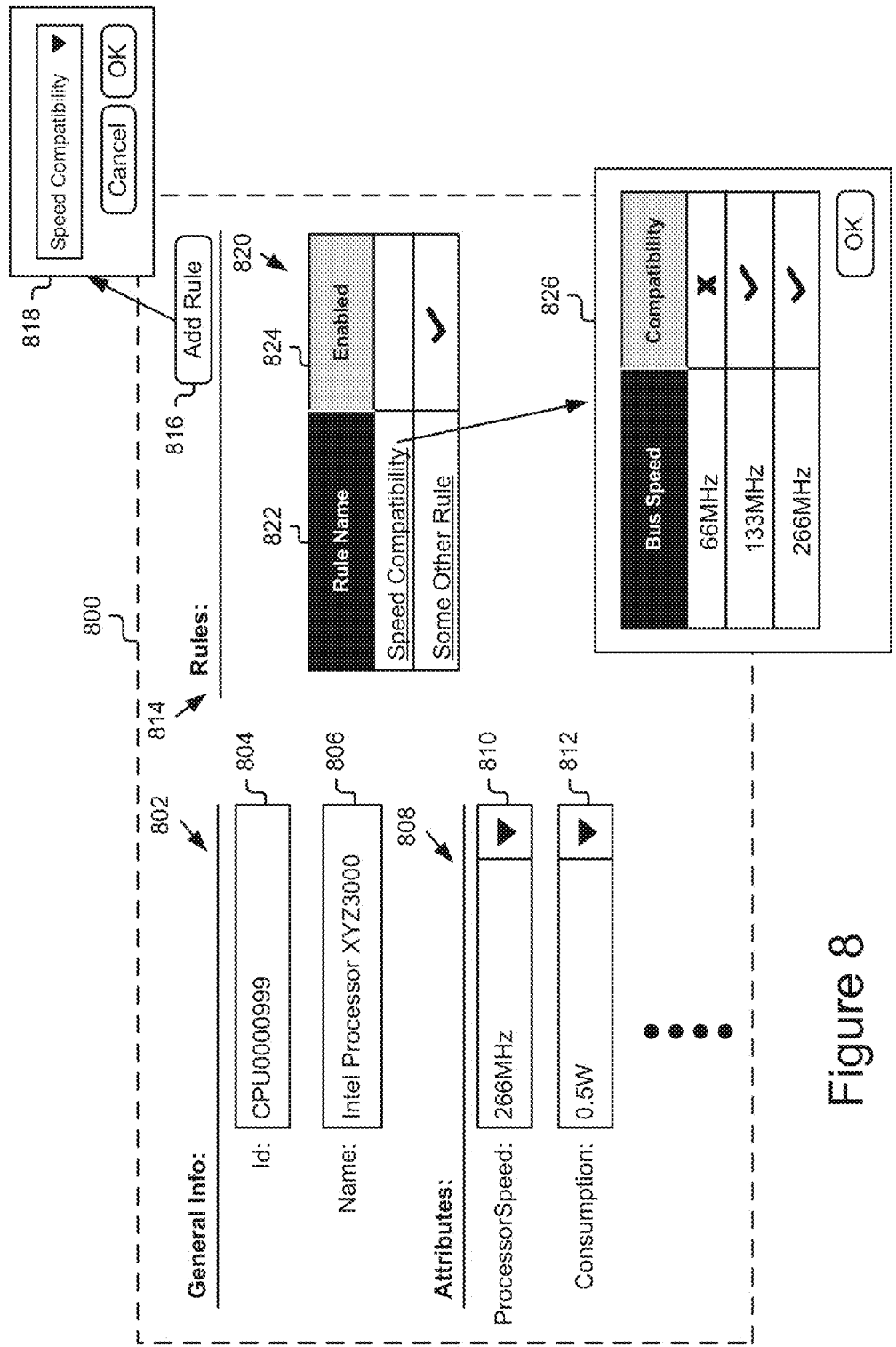
FIG. 8 is a graphical representation of an example product definition interface.

FIG. 8 is a graphical representation of an example product definition interface 800. In some embodiments, a user (e.g., product owner) may use the interface 800 to define a new product or update an existing product, as well as add rules that govern the modeling of the product. As depicted, the interface 800 includes an area 802 for entering general information for a product, an area 808 for defining one or more attributes for the product, and an area 814 for associating one or more rules with the product. In some implementations, the interface 800 depicted in the figure may be generated and provided for display by the UI engine 1020 in cooperation with the object model management engine 1022 (e.g., see FIG. 10B).

The general information area 802 includes an ID box 804 for entering an ID for the product and a name box 806 for entering a name for the product. The attribute area 808 includes a dropdown menu 810 for selecting a processor speed for the product and a dropdown menu 812 for selecting power consumption for the product. Rules area 814 includes an "Add rule" button 816 for adding one or more rules into rule list 820. For instance, on clicking the "Add rule" button 816, a dropdown menu 818 containing a list of rules is displayed from which a user can select and add a rule to the rule list 820. In the list, the dropdown menu 818 may suggest any rules automatically determined by the system 900 to be applicable to the product to make it easier and faster for a user to model the product. For example, an applicable rule may include a sub-product in the rule condition or action (e.g., IF or THEN clause), or may refer to any attribute that the sub-product also refers to. In this example, an applicable speed compatibility rule is proposed when a user presses the "Add Rule" button.

The rule list 820 lists the one or more rules that are added using the "Add rule" button 816. The rule list 820 includes a first column 822 for containing rule name(s) for the one or more rules and a second column 824 for enabling/associating the one or more rules from the first column 822 with the product. On clicking a rule name from the column 822 of the rule table 820, detailed description about that rule including its rule condition and action information is displayed as indicated by reference numeral 826.

Figure 9:
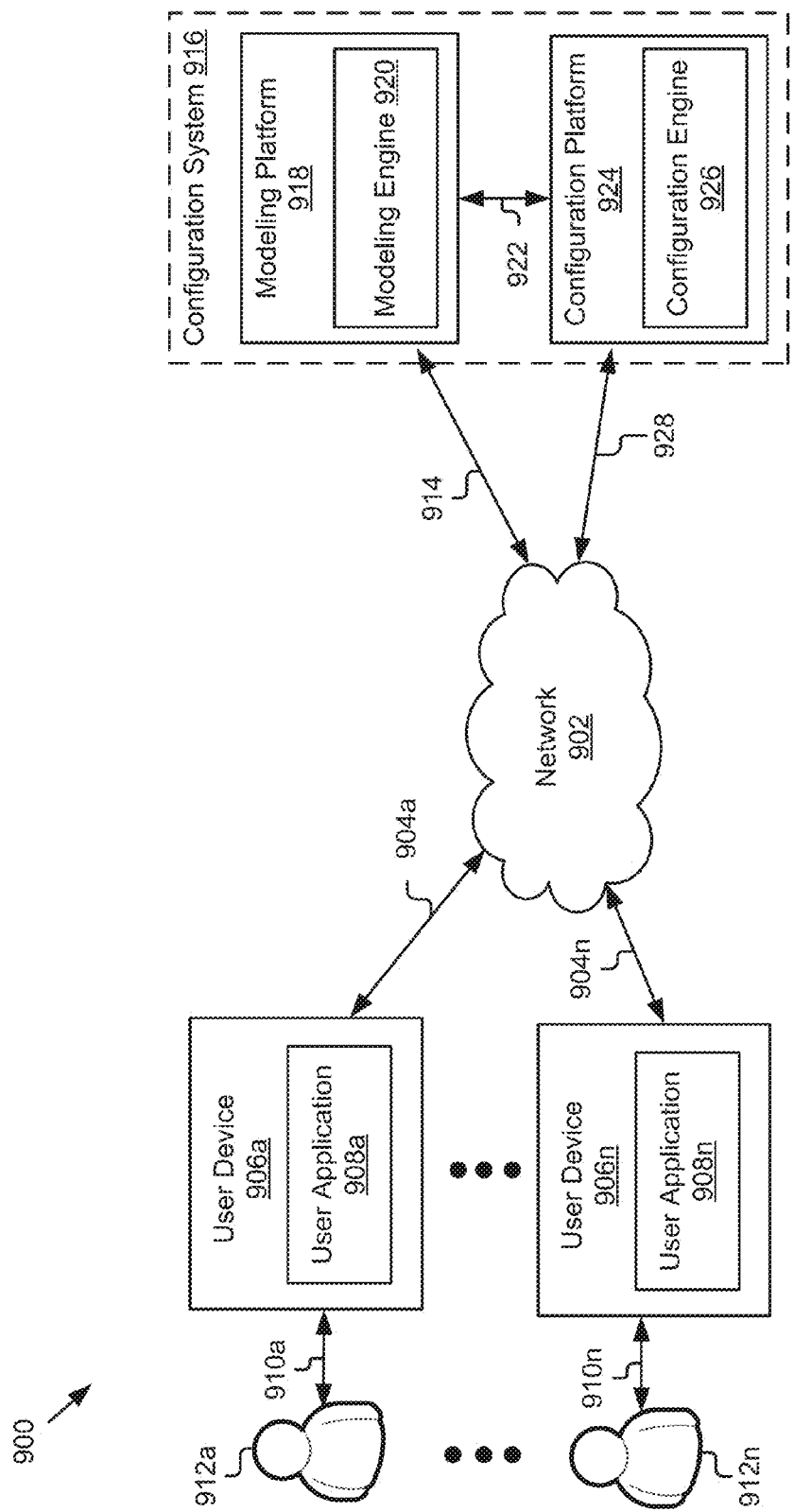
FIG. 9 is a block diagram illustrating an example system for rule assignment to a model and rule creation using multi-dimensional table.

FIG. 9 is a block diagram illustrating an example system for rule assignment to a model and rule creation using a multi-dimensional table. The illustrated system 900 includes user devices 906$a$. . . 906$n$ and a configuration system 916, which are communicatively coupled via a network 902 for interaction with one another. For example, the user devices 906$a$. . . 906$n$ may be respectively coupled to the network 902 via signal lines 904$a$. . . 904$n$ and may be accessible by users 912$a$. . . 912$n$ (also referred to individually and collectively as 912) as illustrated by lines 910$a$. . . 910$n$. As depicted in the figure, the configuration system 916 includes a modeling platform 918 and a configuration platform 924. The modeling platform 918 may be respectively coupled to the network 902 via signal line 914, the configuration platform 924 may be coupled to the network 902 via signal line 928, and the modeling platform 918 and the configuration platform 924 may be coupled to each other via signal line 922. The use of the nomenclature "a" and "n" in the reference numbers indicates that the system 900 may include any number of those elements having that nomenclature.

It should be understood that the system 900 illustrated in FIG. 9 is representative of an example system for rule assignment to model and rule creation using multi-dimensional table, and that a variety of different system environments and configurations are contemplated and are within the scope of the present disclosure. For instance, some implementations may include additional or fewer computing devices, services, and/or networks, and may implement various functionality user or configuration system-side. Further, various entities of the system may be integrated into to a single computing device or system or additional computing devices or systems, etc.

The network 902 may include any number of networks. For example, the network 902 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The user devices 906$a$. . . 906$n$ (also referred to individually and collectively as 906) are computing devices having data processing and communication capabilities. In some implementations, a user device 906 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The user devices 906$a$. . . 906$n$ may couple to and communicate with one another and the other entities of the system 900 via the network 902 using a wireless and/or wired connection.

Examples of user devices 906 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more user devices 906 are depicted in FIG. 9, the system 900 may include any number of user devices 906. In addition, the user devices 906$a$. . . 906$n$ may be the same or different types of computing devices.

In the depicted implementation, the user devices 906a... 906n respectively contain instances 908a... 908n of a user application (also referred to individually and collectively as 908). The user application 908 may be storable in a memory (not shown) and executable by a processor (not shown) of a user device 906. The user application 908 may include a browser application that can retrieve and/or process information hosted by one or more entities of the system 900 (for example, the modeling platform 918 and/or the configuration platform 924) and can present the information on a display device (not shown) on the user device 906.

The configuration system 916 may include one or more computing devices having data processing, storing, and communication capabilities. For example, the configuration system 916 and/or its constituent components like the modeling platform 918 and/or the configuration platform 924 may include one or more hardware servers, virtual servers, server arrays, storage devices and/or systems, etc., which may be networked via the network 902 for cooperation and communication with one another. In some implementations, the configuration system 916, including the modeling platform 918 and/or the configuration platform 924, may be implemented using cloud-based architectures where one or more computer functions are performed by remote computing systems and devices at the request of a local computer device, although further implementations are also contemplated where the modeling platform 918 and/or the configuration platform 924 are implemented using local hardware and/or software resources or a combination of the foregoing. Additional structure, acts, and/or functionality of the modeling platform 918 and/or the configuration platform 924 are described in further detail elsewhere herein.

Figure 10A:
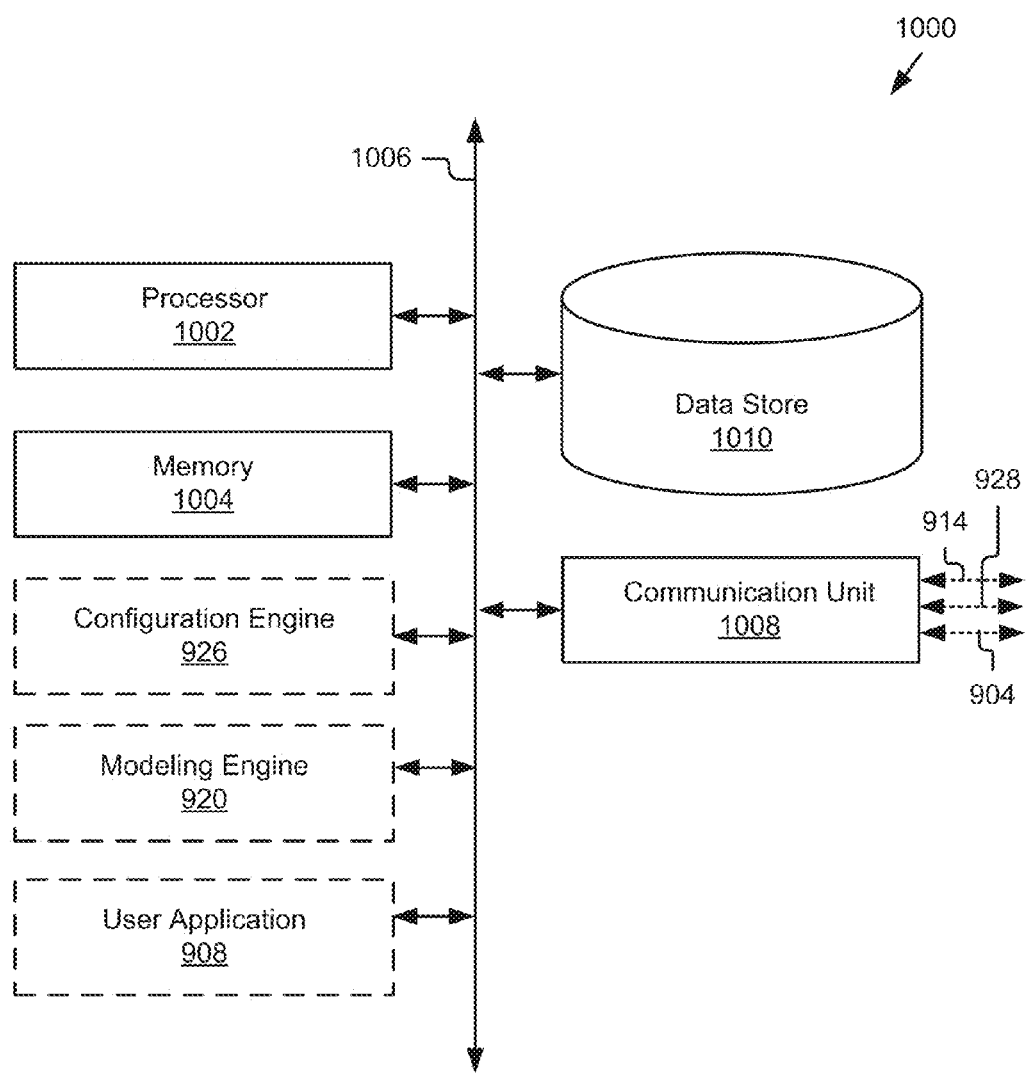
FIG. 10A is a block diagram of an example computing device.

FIG. 10A is a block diagram of an example computing device 1000, which may be representative of a computing device included in the configuration system 916, the modeling platform 918, the configuration platform 924, and/or the user device 906. As depicted, the computing device 1000 may include a processor 1002, a memory 1004, a communication unit 1008, a data store 1010, and one or more of a configuration engine 926, a modeling engine 920, and the user application 908, which may be communicatively coupled by a communication bus 1006.

Depending upon the configuration, the computing device 1000 may include differing components. For instance, in a configuration system implementation, the computing device 1000 may include the modeling engine 920 and/or the configuration engine 926. In a user device configuration, the computing device 1000 may include the user application 908. In further implementations, a first computing device 1000 representative of the modeling platform 918 may include the modeling engine 920, a second computing device 1000 representative of the configuration platform 924 may include the configuration engine 926, and a plurality of third computing devices 1000 representative of the user devices 906a... 906n may respectively include the user applications 908a... 908n. It should be understood that the above configurations are provided by way of example and numerous further configurations are contemplated and possible.

The processor 1002 may execute software instructions by performing various input/output, logical, and/or mathematical operations. The processor 1002 may have various computing architectures to process data signals including, for example, a complex instruction set computer (CISC) architecture, a reduced instruction set computer (RISC) architecture, and/or an architecture implementing a combination of instruction sets. The processor 1002 may be physical and/or virtual, and may include a single core or plurality of processing units and/or cores. In some implementations, the processor 1002 may be capable of generating and providing electronic display signals to a display device (not shown), supporting the display of images, capturing and transmitting images, performing complex tasks including various types of feature extraction and sampling, etc. In some implementations, the processor 1002 may be coupled to the memory 1004 via the bus 1006 to access data and instructions therefrom and store data therein. The bus 1006 may couple the processor 1002 to the other components of the computing device 1000 including, for example, the memory 1004, communication unit 1008, and the data store 1010.

The memory 1004 may store and provide access to data to the other components of the computing device 1000. In some implementations, the memory 1004 may store instructions and/or data that may be executed by the processor 1002. The memory 1004 is also capable of storing other instructions and data, including, for example, an operating system, hardware drivers, other software applications, databases, etc. The memory 1004 may be coupled to the bus 1006 for communication with the processor 1002 and the other components of the computing device 1000.

The memory 1004 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 1002. In some implementations, the memory 1004 may include one or more of volatile memory and non-volatile memory. For example, the memory 1004 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 1004 may be a single device or may include multiple types of devices and configurations.

The bus 1006 can include a communication bus for transferring data between components of a computing device or between computing devices, a network bus system including the network 902 or portions thereof, a processor mesh, a combination thereof, etc. In some implementations, the configuration engine 926 and the modeling engine 920 may cooperate and communicate via a software communication mechanism implemented in association with the bus 1006. The software communication mechanism can include and/or facilitate, for example, inter-process communication, local function or procedure calls, remote procedure calls, network-based communication, secure communication, etc.

The communication unit 1008 may include one or more interface devices for wired and wireless connectivity with the network 902 and the other entities and/or components of the system 900 including, for example, the user devices 906, the modeling platform 918, the configuration platform 924, etc. For instance, the communication unit 1008 may include, but is not limited to, CAT-type interfaces; wireless transceivers for sending and receiving signals using Wi-Fi™; Bluetooth®, cellular communications, etc.; USB interfaces; various combinations thereof; etc. The communication unit 1008 may be coupled to the network 902 via the signal lines 914, 928, and 904. In some implementations, the communication unit 1008 can link the processor 1002 to the network 902, which may in turn be coupled to other processing systems. The communication unit 1008 can provide other connections to the network 902 and to other entities of the system 900 using various standard communication protocols, including, for example, those discussed elsewhere herein.

The data store 1010 is an information source for storing and providing access to data. In some implementations, the data store 1010 may be coupled to the components 1002, 1004, 1008, 920, 926, and/or 908 of the computing device 1000 via the bus 1006 to receive and provide access to data. In some implementations, the data store 1010 may store data received from the other entities 906 and 916 of the system 900, and provide data access to these entities. The data store 1010 can include one or more non-transitory computer-readable mediums for storing the data. In some implementations, the data store 1010 may be incorporated with the memory 1004 or may be distinct therefrom. In some implementations, the data store 1010 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

Figure 10B:
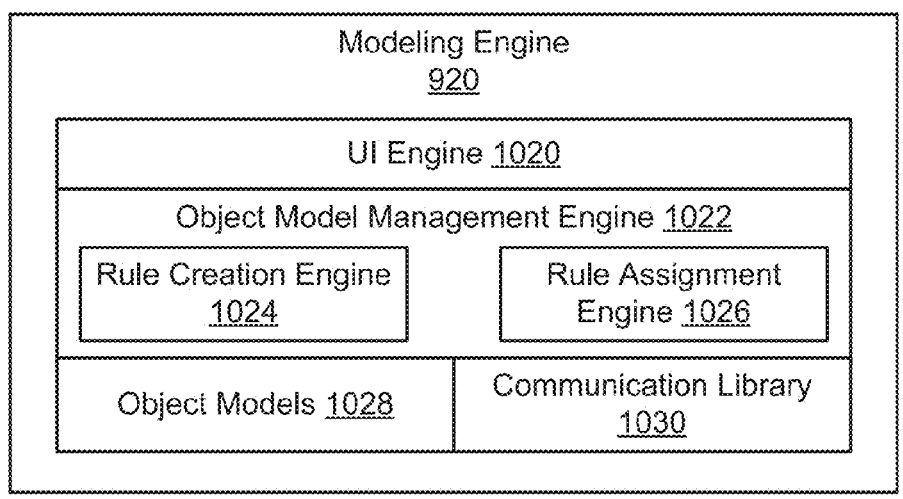
FIG. 10B is a block diagram of an example modeling engine.

FIG. 10B is a block diagram of an example modeling engine 920. As depicted, the modeling engine 920 may include a UI engine 1020, an object model management engine 1022 (including rule creation engine 1024 and rule assignment engine 1026), object models 1028, and a communication library 1030. The components 920, 1020, 1022, 1024, 1026, 1028, and/or 1030 may be communicatively coupled by the bus 1006 and/or the processor 1002 to one another and/or the other components 1004, 1008, 1010, 926, and/or 908 of the computing device 1000. In some implementations, one or more of the components 920, 1020, 1022, 1024, 1026, 1028, and/or 1030 are sets of instructions executable by the processor 1002 to provide their functionality. In other implementations, one or more of the components 920, 1020, 1022, 1024, 1026, 1028, and/or 1030 are stored in the memory 1004 of the modeling platform 918 and are accessible and executable by the processor 1002 to provide their functionality. In any of the foregoing implementations, these components 920, 1020, 1022, 1024, 1026, 1028, and/or 1030 may be adapted for cooperation and communication with the processor 1002 and other components of the modeling platform 918 and/or the configuration platform 924.

The UI engine 1020 includes software and/or hardware logic for generating a user interface, rendering the interface for display to a user, receiving one or more inputs from the user on the user interface, and updating the interface based on the one or more inputs. For instance, the UI engine 1020 can generate an interface including one or more interface components. By way of example, the UI engine 1020 may generate and provide the interfaces 700 and 800 as depicted in FIGS. 7 and 8, respectively. In some implementations, the UI engine 1020 may also be configured to receive data from the configuration engine 926 and render the data for display to a user. For instance, the UI engine 1020 may receive data describing one or more operations performed by the configuration engine 926 and provide the data for display to a user on a user device. In some implementations, the data may be formatted using a markup language such as HTML, XML, JSON, etc., and provided by the UI engine 1020 for rendering and display via the user application 908.

The object model management engine 1022 includes software and/or logic for managing one or more object models 1028. For instance, an object model 1028 may include data describing the model including, for example, one or more option groups, rules, products, attributes, options, etc., being configured and/or defined by a user. The object model management engine 1022 may be responsible to keep these object models 1028 up-to-date based on user configurations associated with the models. By way of example, if a user adds and/or deletes one or more options groups, rules, attributes, etc. to/from a particular model, then the object model management engine 1022 may incorporate these changes in the corresponding object model 1028. In some implementations, the object model management engine 1022 may be responsible to manage one or more rules that are associated with the object models 1028.

As depicted, the object model management engine 1020 includes a rule creation engine 1024 and a rule assignment engine 1026. The rule creation engine 1024 includes software and/or hardware logic for creating and updating a rule. The rule creation engine 1024 may define (e.g., create or update) a rule based on receiving a rule data from a user using an instance of the user application 908. The rule data may embody the table-based structure of the rule, which the rule creation engine 1024 can interpret and store in a memory and/or data store, such as the memory 1004 and/or the storage 1010, for access and use by the modeling engine 920, the configuration engine 926, or various components thereof.

For an existing rule that has been updated by a user, the rule creation engine 1024 may update a corresponding data structure in the memory and/or data store with the aspects of the rule that have been updated. For a new rule, the rule creation engine 1024 may create a new data structure in the memory and/or the data store. In some embodiments, the data structure has a table-based format that includes columns reflecting the columns representing the rule condition, any rows reflecting expressions of the rule. The data structure may include other data associated with the rule, such as, but not limited to, general information about the rule, a rule type, and any rule assignments.

In some implementations, the rule creation engine 1024 may receive a request via the network 902 from a user application 908 of a user 912 requesting to create a new rule or update an existing rule. Upon receiving the request, the rule creation engine 1024 may signal the UI engine 1020 to generate a rule definition interface (e.g., interface 700 as shown in FIG. 7) and provide the rule definition interface for presentation to the user via the user application 908.

In some implementations, the rule creation engine 1024 may define a rule using two distinct phases. In the first phase, the rule creation engine 1024 may receive an input from a first user (e.g., a modeler) requesting to define a rule template. Upon receiving the request, the rule creation engine 1024 may generate data for a table-based rule structure and provide the rule structure to the UI engine 1020 for presentation to the first user via an associated user interface. The table-based rule structure may include data describing an existing rule template, if one is being updated. The first user may then use the table-rule structure to define (e.g., create, update, etc.) the rule template by inputting data, as described above with respect to FIG. 6, for example. Once the user has entered data defining the rule template, the rule creation engine 1024 may receive the data (e.g., from the user application 908) and create or update the rule template (e.g., as a global rule).

In the second phase, the rule creation engine 1024 may receive a request from a second user to define one or more conditions that trigger the rule, and in response, the rule creation engine 1024 may retrieve the data describing the rule template and provide the data describing it to the UI engine 1020 for presentation to the to a second user (e.g., a product owner) via an associated user interface. The second user may then define one or more expressions of the rule by entering one or more corresponding rows into the table-based rule structure included in the rule template, as described above with reference to at least FIG. 6, for example. Once the user has entered the expressions, the rule creation engine 1024 may receive the data describing the completed rule (e.g., from the user application 908) and save the rule in the memory 1004 and/or the data store 1010, as discussed elsewhere herein.

In some embodiments, when processing a rule, the rule creation engine 1024 can signal the rule assignment engine 1026 to flag a rule as assignable to one or more items, such as products, option groups, options, categories, attributes, etc., as specified by the rule definition. The rule creation engine 1024 can additionally or alternatively signal the rule assignment engine 1026 to explicitly assign the rule to one or more aspects of a given model. The rule creation engine 1024 and the rule assignment engine 1026 may be communicatively coupled to one another via the processor 10002 to send and receive data.

The rule assignment engine 1026 includes software and/or hardware logic for assigning rules to models. The rule assignment engine 1026 is capable of assigning rules to models automatically (implicitly) based on commonalities between the rules and the models. An automatic/implicit rule assignment may in some cases be provisional and provided to the user for confirmation, revision, or rejection, as discussed elsewhere herein. The rule assignment engine 1026 is also capable of assigning rules to models explicitly based on assignment requests received from users. In some implementations, the rule assignment engine 1026 may receive these assignment requests from one or more components of the system 900, including for example, the rule creation engine 1024, the user application 908, the UI engine 1020, etc.

In some implementations, the rule assignment engine 1026 may implicitly assign a rule to a model based on any common aspects between the rule and the model. Common aspects may include, without limitation, attributes, option groups, products, categories, etc. In some implementations, the rule assignment engine 1026 may automatically assign a rule to a model by determining common aspects between previous defined rules/rule templates and the model. For example, the rule assignment engine 1026 can determine the component(s) of a model (e.g., stored in the memory 1004 or the data store 1010) and querying a set of rules (e.g., rule templates, global rules, other rules, etc.) stored in the data store 1010 for rule(s) having parameter(s) matching the component(s) of the model, and then assigning those rule(s) to the applicable components of the model. In some cases, the rule(s) may be assigned by the rule assignment engine 1026 by storing assignment data in the memory 1004 and/or the data store 1010 in association with the model that describes the commonalities between the model and the rule(s).

In some implementations, the rule assignment engine 1026 can override an implicit rule assignment that is previously determined by it based on a user preference. For instance, the UI engine 1020 may provide a rule definition interface describing the implicit rule assignment and including an option for the user to override the automatically determine assignment by deleting or modifying the rule assignment. For example, with reference to FIG. 4, the rule assignment engine 1026 may enable the user to un-assign the assignment of rule 414 to group 406 of model 402.

In some implementations, the rule assignment engine 1026 can further force assign a rule to a model. For instance, the rule assignment engine 1026 may receive a force rule request from a user. The request may indicate that a given rule be assigned to an aspect of a model even if the rule does not directly apply or applies slightly differently to the model. For example, with reference to again FIG. 4, the rule assignment engine 1026 may enable the user to force assign rule 414 to group 408 even when the rule 414 and the group 408 do not have attributes in common.

The communication library 1030 includes software and/or hardware logic for interacting with APIs (not shown) of the configuration engine 926. For instance, the modeling engine 920 and one or more its components (e.g., UI engine 1020, rule creation engine 1024, the rule assignment engine 1026, etc.) may be coupled to and communicate with the communication library 1030 to interact with the APIs of the configuration engine 926 for accessing various functionality, acts, and/or data provided by the configuration engine 926 and/or its respective components. For instance, the rule assignment engine 1026 may communicate with the communication library 1030 to interact with the APIs of the configuration engine 926 for performing implicit rule assignments in cooperation with the configuration engine 926 as described above. In some implementations, the communication library 1030 may include APIs, which various components of the system 900 may use to access functionality, acts, and/or data provided by the modeling engine 920.

Figure 11:
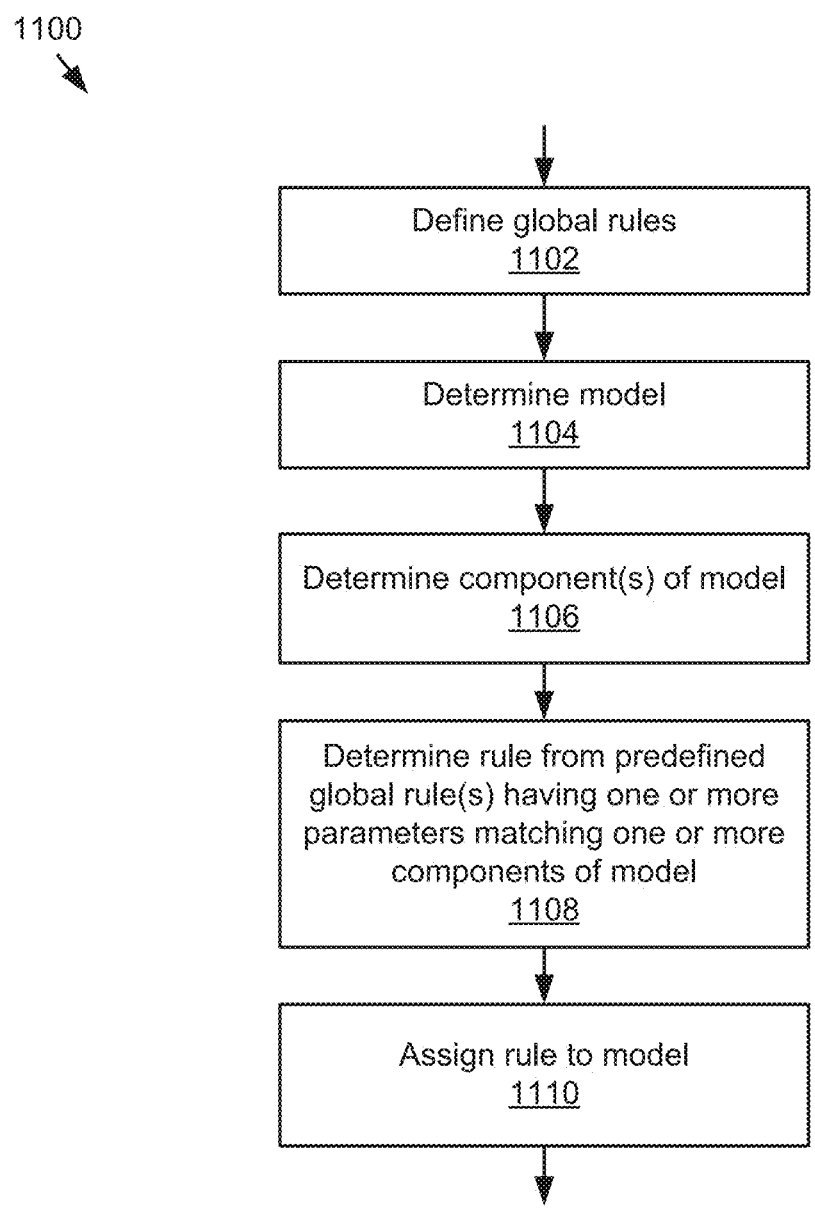
FIG. 11 is a flowchart of an example method for assigning a rule to a model.

FIG. 11 is a flowchart of an example method for assigning a rule to a model. The method 1100 begins by defining 1102 global rules. The global rules may include a set of rules with parameters representing various aspects (e.g., option groups, attributes, categories, products, etc.) associated with the rules. In some cases, the rule creation engine 1024 can create the global rules based on input received from a user. Next, the method 1100 may determine 1104 a model and then determine 1106 one or more components of the model. The one or more components of the model may include one or more of option groups, categories, products, attributes, options, etc., as displayed in model 308 of FIG. 3, for example.

The method 1100 may then determine 1108 a rule from the global rules that has one or more parameters matching one or more components of the model. For example, as shown in FIG. 3, rule 302 has parameters 320 and 322 matching components 316 and 318 of model 308. Next, the method 1100 may assign 1110 the rule to the model based on the matching. In some implementations, the operations 1104, 1106, 1108, and 1110 may be performed by the rule assignment engine 1026 in cooperation with the other components of the system 100, as discussed elsewhere herein.

Figure 12:
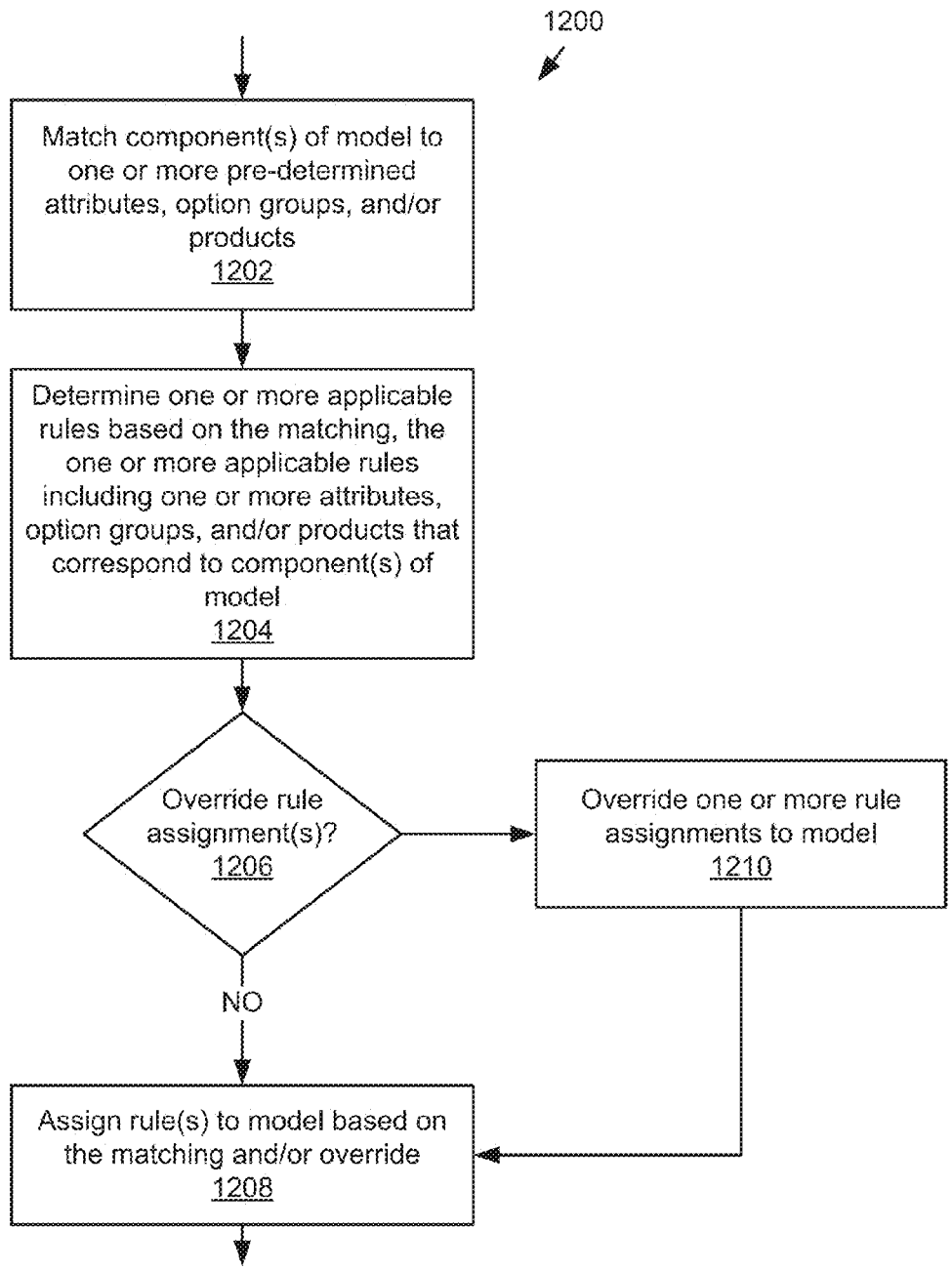
FIG. 12 is a flowchart of another example method for assigning a rule to a model.

FIG. 12 is a flowchart of an example method for assigning a rule to a model. The method 1200 begins by matching one or more components of the model to one or more predetermined attributes, option groups, and/or products. The method 1200 may determine 1204 one or more applicable rules based on the matching performed in block 1202. In some implementations, the one or more applicable rules include one or more attributes, option groups, and/or products that correspond to the one or more components of the model.

The method 1200 may then proceed to block 1206 to determine whether to override rule assignment(s). In some embodiments, the determination in block 1206 is based on input provided by a user via an associated user interface requesting to override the assignment, and the rule assignment engine 1026 may determine to override the assignment based on the input. If the result of the determination in block 1206 is affirmative, then the method 1200 may proceed to block 1210 and override one or more of the existing rule assignments. In some embodiments, the rule assignment engine 1026 may perform the override of a rule assignment specified by a user by deleting a corresponding assignment definition from an object model representing the model. In one instance, a user may override various rule assignments by un-selecting or removing one or more rules from the one or more applicable rules automatically assigned to the model. The method 1200 may then proceed to assign 1208 any matching rules that have not been overridden to the model.

On the other hand, if the result of the determination in block 1206 is negative, then the method 1200 may bypass the override block 1210 and proceed to the block 1208 to assign the one or more applicable rules found based on the matching to the model. In some implementations, the operations described in the blocks of the method 1200 may be performed by the rule assignment engine 1026 in cooperation with various other components of the system 100.

Figure 13:
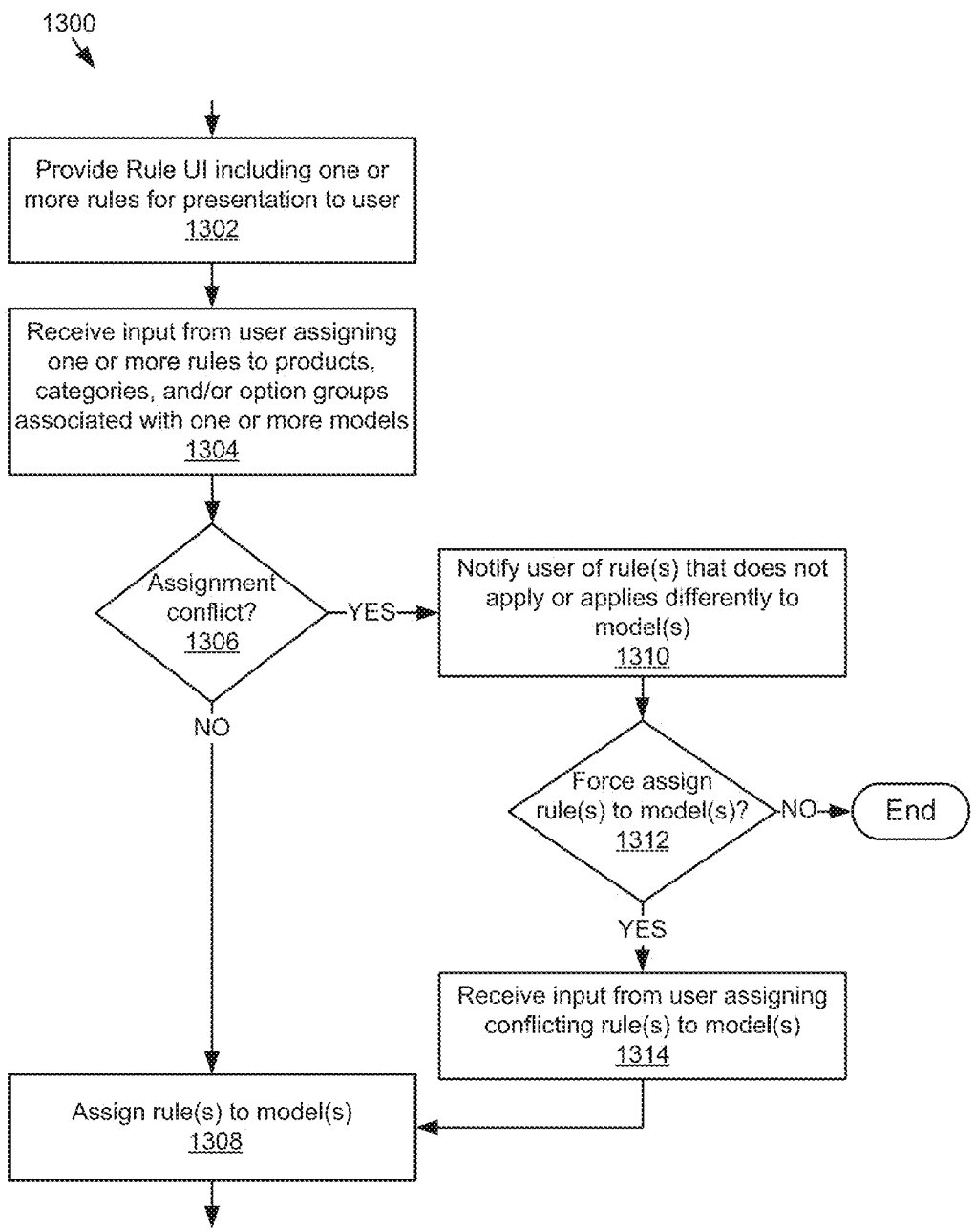
FIG. 13 is a flowchart of an example method for explicitly assigning a rule to a model.

FIG. 13 is a flowchart of an example method for explicitly assigning a rule to a model. The method 1300 begins by providing 1302 a rule definition interface including one or more rules to a user. For example, the rule creation engine 1024 may facilitate the generation of the rule definition interface, such as the interface 700 in FIG. 7, which the UI engine 1020 may send for presentation to the user via the user application 908. The method 1300 may receive 1304 input from the user (e.g., via the interface, the user application 908, and the network 902, etc.). The input may include a request to assign one or more rules presented to the user in the interface to one or more products, categories, and/or option groups that may be associated with one or more models.

The method 1300 may then proceed to block 1306 where the rule assignment engine 1026 may determine whether there are any assignment conflicts with the assigned rules. If the result of the assignment conflict determination in block 1306 is negative, then the method 1300 may assign 1308 the one or more rules to the one or more models based on the assignment received from the user in block 1304. On the other hand, if the result of the determination in block 1306 is affirmative, then the method 1300 may notify 1310 the user (e.g., by sending a notification to the user application 908 of the user) of one or more rules that may conflict with the one or more models based on rules assigned by the user. In some instances, the user may be notified of one or more rules that does not apply or applies slightly differently to the one or more models. In other instances, the user may be notified (e.g., via an associated user interface) of one or more rules that do not have any common aspects (e.g., products, attributes, option groups, etc.) with the one or more models.

Upon notifying the user of the one or more conflicting rules, the method 1300 may then proceed to block 1312 to determine whether the user still wants to force assign the one or more conflicting rules to the models (e.g., via a response received in reply to the notification). If the answer is yes, then the method 1300 may receive another input 1314 from the user (e.g., via an associated user interface, the user application 908, and the network 902, etc.) assigning the one or more conflicting rules to the models. Otherwise, the method 1300 may terminate and end. In some implementations, the operations of the method 1300 may be performed by the rule assignment engine 1026 in cooperation with one or more components of the system 100, such as the rule creation engine 1024 and the UI engine 1020, as discussed elsewhere herein.

Figure 14:
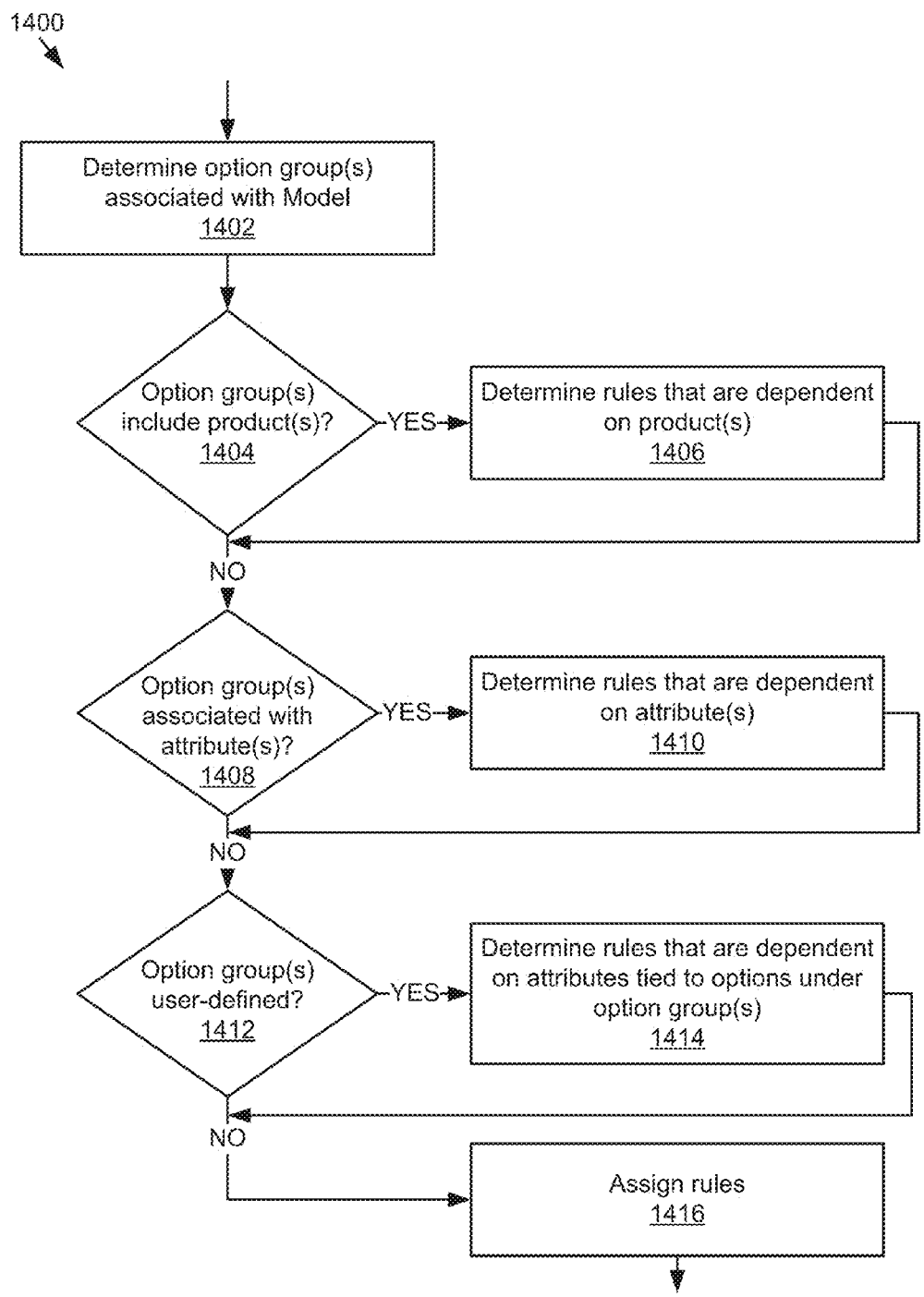
FIG. 14 is a flowchart of an example method for implicitly assigning a rule to a model.

FIG. 14 is a flowchart of an example method for implicitly assigning rule to a model. The method 1400 may begin by determining 1402 one or more option groups associated with a model. Upon determining the one or more option groups, the method 1400 may determine in block 1404 whether option groups include one or more of products. If the result of the determination in block 1404 is affirmative, then the method 1400 may determine one or more rules that are dependent on the one or more products. For instance, the method 1400 may determine rules that act or listen to the one or more products and/or rules that act or listen to any attributes that are tied to the one or more products, and then proceed to block 1408.

If the result of the determination in block 1404 is negative, the method 1400 may proceed to block 1408, in which the method 1400 determines whether the one or more option groups determined in block 1402 are associated with one or more attributes. If the result of the determination in block 1408 is affirmative, then the method 1400 may determine 1410 one or more rules that are dependent on the one or more attributes. For instance, the method 1400 may determine which rules act or listen to the one or more attributes and/or which rules that act or listen to products that have the one or more attributes tied to them. The method 1400 may then proceed to block 1412.

If the result of the determination in block 1408 is negative, the method 1400 may proceed to block 1412, in which the method 1400 determines whether the one or more option groups determined in block 1402 are user defined. If the result of the determination in block 1412 is affirmative, then the method 1400 may determine one or more rules that are dependent on one or more attributes that may be tied to one or more options under the one or more option groups that are user-defined, and then continue to block 1416. Otherwise, the method may proceed to block 1416. In block 1416, the method 1400 may assign the rules determined in blocks 1406, 1410, and/or 1414 to the model. In some implementations, the operations in the blocks 1402, 1404, 1406, 1408, 1410, 1412, 1414, and/or 1416 may be performed by the rule assignment engine 1026 in cooperation with the configuration engine 926 and/or other components of the system 100.

Figure 15:
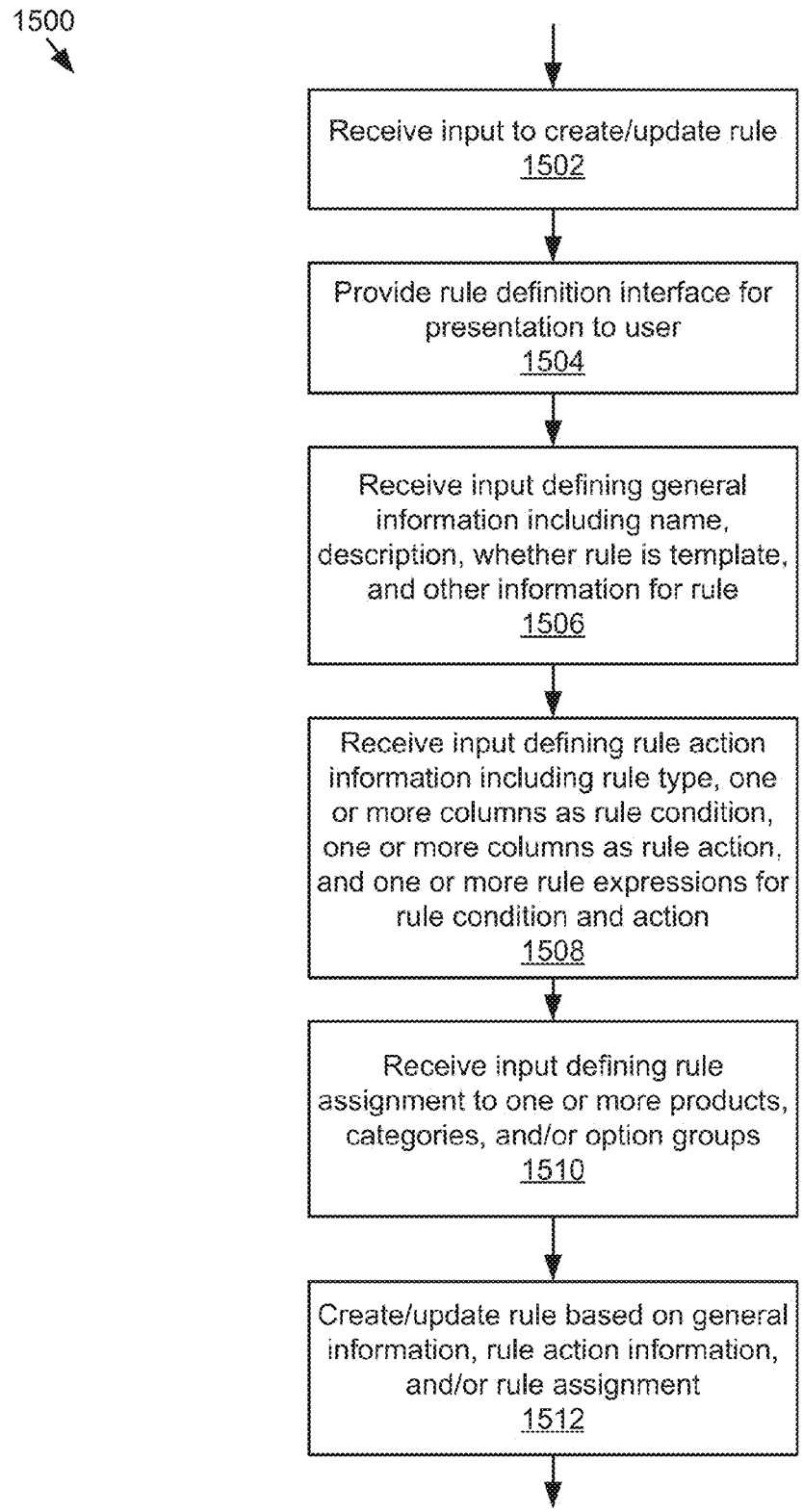
FIG. 15 is a flowchart of an example method for creating and/or updating a rule.

FIG. 15 is a flowchart of an example method for creating and/or updating a rule. The method 1500 may begin by receiving an input from a user to create/update a rule. The method 1500 may provide 1504 rule definition interface for presentation to the user. The rule definition interface includes necessary elements for the creation and/or modification of a rule. In some implementations, the rule definition interface may be generated and provided for display to a user by the rule creation engine 1024 in cooperation with the UI engine 1020. The method 1500 may then receive 1506 input from the user. The input may define general information including name for a rule, description for the rule, whether the rule is a template, etc., as depicted in general information area 702 of FIG. 7, for example.

The method 1500 may then receive 1508 input defining rule action information. The rule action information received from the user may include a rule type for the rule that is being created, one or more columns as a rule condition, one or more columns as a rule action, and one or more rule expressions for providing values for the rule condition and action columns.

The method 1500 may then receive 1510 input defining the rule assignment that assigns the rule to one or more products, categories, and/or option groups. In block 1512, the method may create and/or update 1512 the rule based on the general information, the rule action information, and the rule assignment, receive in the preceding blocks. In some implementations, the rule creation engine 1024 may perform the operations of the method 1500 in cooperation with various components of the system 100, as discussed elsewhere herein.

Figure 16:
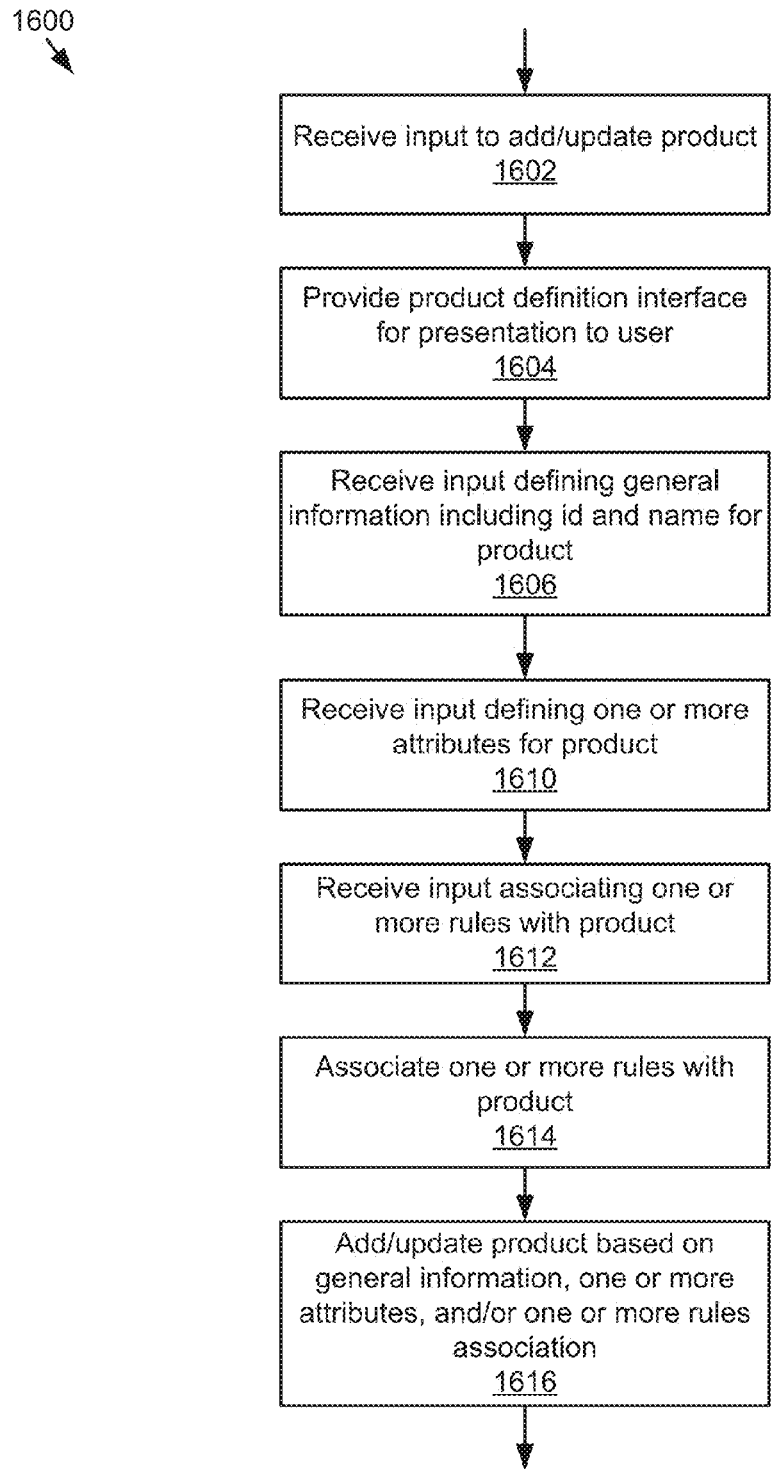
FIG. 16 is a flowchart of an example method for adding and/or updating a product.

FIG. 16 is a flowchart of an example method for adding and/or updating a product. The method 1600 may begin by receiving 1602 an input from a user to add and/or update the product, and in response, may provide a product definition interface (e.g., See FIG. 8) for presentation to the user. In some implementations, the product definition interface may be generated and provided for display by the UI engine 1020 in cooperation with one or more other components of the system 100. The method 1600 may then receive 1606 input defining general information for a product including a product ID and name, as shown in general information area 802 of FIG. 8, for example.

The method 1600 may proceed to block 1610 to receive input defining one or more attributes for the product from the user, as shown in attributes area 808 of FIG. 8, for example. The method 1600 may also receive 1612 input associating one or more rules with the product. Upon receiving the input in block 1612, the method 1600 may associate the one or more rules with the product. In some instances, the rule assignment engine 1026 may receive the input in block 1612 use it to associate the one or more rules with the product. The method 1600 may then add/update 1616 the product based on the general information, the one or more attributes, and the one or more rule associations received in blocks 1606, 1610, and 1612, respectively. The operations of the method 1600 may be performed by the modeling engine 920, and/or various components thereof, in association with one or more other components of the system 100.

Figure 17:
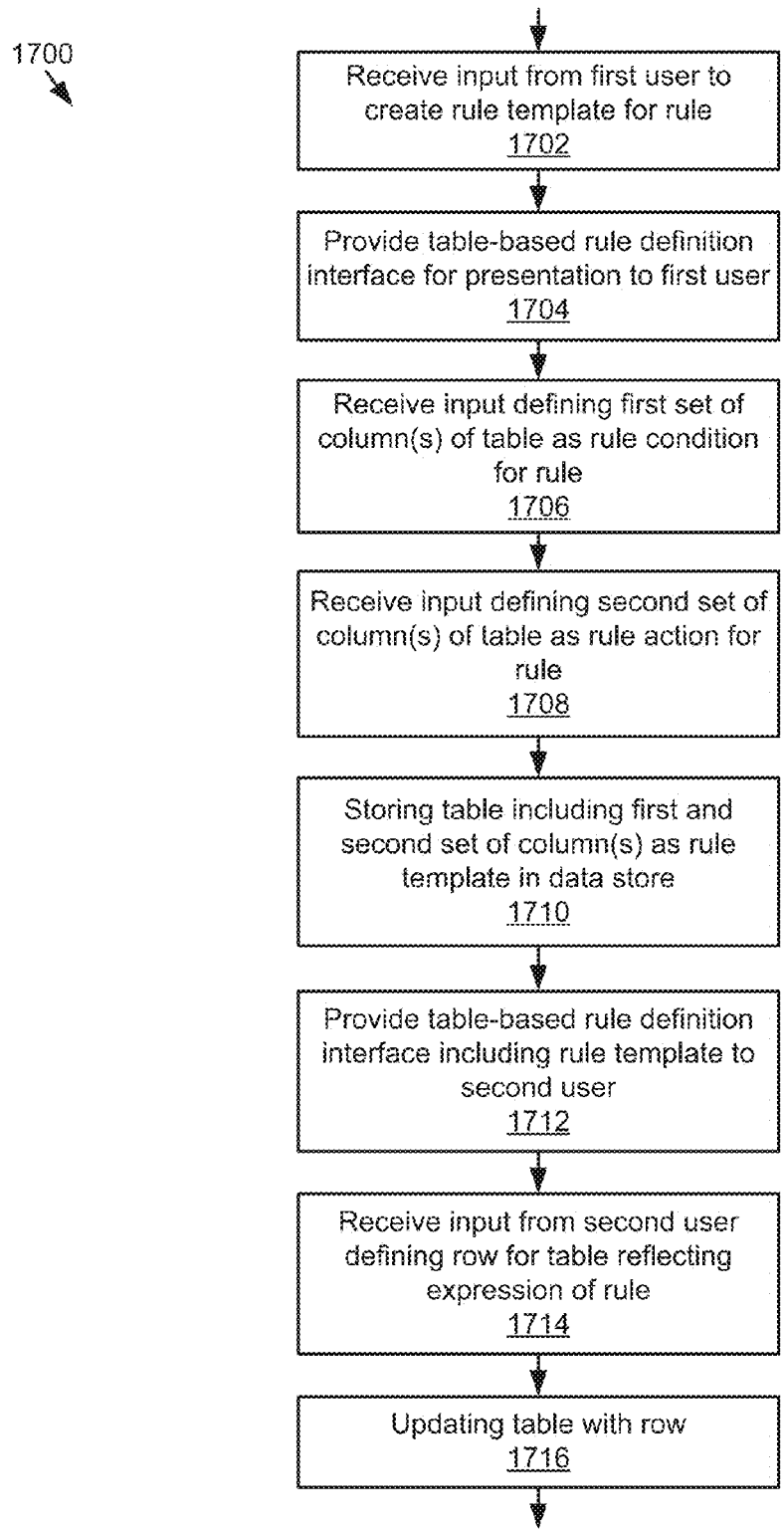
FIG. 17 is a flowchart of an example method for creating a rule template and defining a rule using the rule template.

FIG. 17 is a flowchart of an example method 1700 for creating a rule template and defining a rule using the rule template. The method 1700 may begin by receiving 1702 an input from a first user to create a rule template for a rule. In some instances, the input may be received from a modeler. The method 1700 may provide 1704 a table-based rule definition interface for presentation to the first user. For example, the rule creation engine 1024, in cooperation with the UI engine 1020, may generate a table-based rule structure 604 (FIG. 6) and then provide for presentation to the first user.

The method 1700 may then receive 1706 an input defining a first set of columns of the table as a rule condition and receive 1708 an input defining a second set of columns of the table as a rule action for the rule. The first set of columns may represent a rule condition 606 and the second set of columns may represent a rule action 608, as shown in the table structure 604 of FIG. 6, for example. The method 1700 may then store 1710 the table including the first and the second set of columns as rule template in a memory and/or a data store. For instance, the rule creation engine 1024 may receive the inputs as described in blocks 1706 and 1708, interpret them, and then store the table as the rule template in the data store 1010.

The method 1700 may then provide 1712 a table-based rule definition interface including the rule template for presentation to a second user. In some instances, the second user may be a product owner. The method 1700 may receive 1714 input from the second user defining a row for the table reflecting an expression for the rule as depicted. The method 1700 may then update 1716 the table with the row. In some implementations, the UI engine 1020 may provide the table-based rule definition interface for presentation to the second user in block 1712 and the rule creation engine 1024 may receive the input in block 1714 in response.

Figure 18:
FIG. 18 is a flowchart of an example method for removing non-matching rules from models based on revisions to the models and alerting users of the removal of the non-matching rules

FIG. 18 is a flowchart of an example method 1800 for removing non-matching rules from models based on revisions to the models and alerting users of the removal of the non-matching rules. In block 1802, the object model management engine 1022 may receive one or more revisions to the model. For instance, the object model management engine 1022 may receive a revision request via the network 902 from a user using a user application 908 requesting the removal of an aspect (e.g., attribute, option group, category, product, etc.) of the model. In block 1804, the object model management engine 1022 may revise the model using the revision(s) and then determine in block 1806 whether one or more rules associated with the model no longer match one or more corresponding aspects of the model based on the revision(s). If one or more rules are determined to no longer match in block 1806, the object model management engine 1022 may remove the non-matching rule(s) from the model in block 1808. Alternatively, while not depicted, if all the applicable rules are determined to still match, the method 1800 may end. Otherwise, the object model management engine 1022 may cooperate with the UI engine 1020 to generate a notification describing the removal of the non-matching rule(s) from the model in block 1810 and the UI engine 1020 may provide the notification to the user in block 1812. For instance, the UI engine 1020 may send the notification via the network 902 to the user device 908 of the user for presentation to the user via a user application 908.

In some embodiments, the configuration system 916 may warn the user (e.g., an admin) via a dialog presented by the user application 908 while the user is editing the rule, that the changes that are about to be made will make the rule incompatible with one or more other models with which the rule is associated. Responsive to the warning, the user can cancel the change (e.g., by selecting a corresponding cancel element in a dialog displayed by the user application 908). If the user continues with the change, the rule will no longer apply to the other models. For instance, responsive to the changes, the object model management engine 1022 may revise the other models by removing the association between the rule and those models. Later, when a user opens any of the other models for viewing and/or configuration, the configuration system 916 may notify the user (e.g., via an associated interface) that explains to the user that one or more of the previously assigned rules are no longer applicable to that model.

The method 1800 is advantageous at least because it can notify a user if a model is being changed in a way where previously assigned rules no longer match the aspects (e.g., attributes) of the model that they were paired with; can automatically remove the non-matching rules from the model, but warn the user that it will do so. One example revision that can invalidate an existing rule assignment includes removing an option group from a model that is mentioned in an assigned rule. Because the option group has been removed from the model and is no longer present in the model, the rule may no longer have any bearing on the model and thus it does not make sense to include in the model. Another example revision that can invalidate an existing rule assignment includes adding an option group to a rule while that rule is assigned to one or more models that do not have that option group; hence the rule no longer applies. It should be understood that numerous other revision variations are possible and, in addition to option groups, the above revisions may apply to attributes, categories, products, or any other suitable aspect of the model.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
predefining a set of rules, each of the rules including one or more condition parameters and one or more action parameters associated with one or more attributes;
after the set of rules have been predefined, determining a model;
determining one or more components of the model;
determining a rule from the set of predefined rules having one or more of the one or more condition parameters and the one or more action parameters matching one or more of the one or more components of the model; and
assigning the rule to the model.

2. The computer-implemented method of claim 1, wherein the rule includes the one or more attributes, option groups, and products, and the one or more attributes, option groups, and products correspond to the one or more components of the model.

3. The computer-implemented method of claim 1, further comprising:
overriding the rule that is assigned to the model by assigning the rule differently to the model or assigning another rule to the model.

4. The computer-implemented method of claim 3, further comprising:
providing a rule definition interface including the assignment of the rule to the model for presentation to a user; and
receiving an input from the user to override the assignment of the rule.

5. The computer-implemented method of claim 1, wherein determining the rule from the set of predefined rules includes automatically determining the rule based on a common attribute between the rule and the model.

6. The computer-implemented method of claim 5, wherein the common attribute includes an option group, attribute, or product, and the model and the rule each includes the option group, attribute, or product.

7. The computer-implemented method of claim 1, further comprising:
determining an option group associated with the model;
determining that the option group includes a product; and
determining that the rule is dependent on the product, wherein the rule is assigned to the model based on the rule being dependent on the product.

8. The computer-implemented method of claim 1, further comprising:
determining an option group associated with the model;
determining that the option group is associated with an attribute; and
determining that the rule is dependent on the attribute, wherein the rule is assigned to the model based on the rule being dependent on the attribute.

9. The computer-implemented method of claim 1, further comprising:
determining an option group associated with the model is user-defined;
determining an attribute tied to an option of the option group; and
determining a rule is dependent on the attribute tied to the option of the option group, wherein the rule is assigned to the model based on the rule being dependent on the attribute.

10. A computer-implemented method, comprising:
receiving an input from a first user to create a rule template for a rule;
providing a table-based rule definition interface for presentation to the first user;
receiving an input defining a first set of one or more columns of a table as a rule condition for the rule;
receiving an input defining a second set of one or more columns of the table as a rule action for the rule;
storing the table including the first set of one or more columns and the second set of one or more columns as the rule template in a data store;
providing the table-based rule definition interface including the rule template to a second user;
receiving an input from the second user defining a row for the table reflecting an expression of the rule;
updating the table with the row; and
automatically identifying the rule as assignable to a corresponding model having one or more components based on matching one or more of the rule condition and the rule action to at least one of the one or more components of the model.

11. The computer-implemented method of claim 10, wherein the one or more columns representing the rule condition and the one or more columns representing the rule action each include one of a category, an option group, an attribute type, and a quantity and the expression of the rule input by the second user includes a value for each of the one or more columns representing the rule condition and for each of the one or more columns representing the rule action.

12. A system comprising:
one or more processors; and
a modeling engine, executable by the one or more processors, to predefine a set of rules, each of the rules including one or more condition parameters and one or more action parameters associated with one or more attributes, the modeling engine further executable by the one or more processors to determine a model, determine one or more components of the model, determine a rule from the set of predefined rules having one or more of the one or more condition parameters and the one or more action parameters matching one or more of the one or more components of the model, and assign the rule to the model.

13. The system of claim 12, wherein the rule includes the one or more attributes, option groups, and products, and the one or more attributes, option groups, and products correspond to the one or more components of the model.

14. The system of claim 12, wherein the modeling engine is further executable to:

override the rule that is assigned to the model by assigning the rule differently to the model or assigning another rule to the model.

15. The system of claim 14, wherein the modeling engine is further executable to:
provide a rule definition interface including the assignment of the rule to the model for presentation to a user; and
receive an input from the user to override the assignment of the rule.

16. The system of claim 12, wherein to determine the rule from the set of predefined rules includes automatically determining the rule based on a common attribute between the rule and the model.

17. The system of claim 16, wherein the common attribute includes an option group, attribute, or product, and the model and the rule each includes the option group, attribute, or product.

18. The system of claim 12, wherein the modeling engine is further executable to:
determine an option group associated with the model;
determine that the option group includes a product; and
determine that the rule is dependent on the product, wherein the rule is assignment to the model based on the rule begin dependent on the product.

19. The system of claim 12, wherein the modeling engine is further executable to:
determine an option group associated with the model;
determine that the option group is associated with an attribute; and
determine that the rule is dependent on the attribute, wherein the rule is assigned to the model based on the rule being dependent on the attribute.

20. The system of claim 12, wherein the modeling engine is further executable to:
determine an option group associated with the model is user defined;
determine an attribute tied to an option of the option group; and
determine a rule that is dependent on the attribute tied to the option of the option group, wherein the rule is assigned to the model based on the rule being dependent on the attribute.

21. A system comprising:
one or more processors; and
a modeling engine, executable by the one or more processors, to:
receive an input from a first user to create a rule template for a rule;
provide a table-based rule definition interface for presentation to the first user;
receive an input defining a first set of one or more columns of a table as a rule condition for the rule;
receive an input defining a second set of one or more columns of the table as a rule action for the rule;
store the table including the first set of one or more columns and the second set of one or more columns as the rule template in a data store;
provide the table-based rule definition interface including the rule template to a second user;
receive an input from the second user defining a row for the table reflecting an expression of the rule;
update the table with the row; and
automatically identify the rule as assignable to a corresponding model having one or more components based on matching one or more of the rule condition and the rule action to at least one of the one or more components of the model.

22. The system of claim 21, wherein the one or more columns representing the rule condition and the one or more columns representing the rule action each include one of a category, an option group, an attribute type, and a quantity and the expression of the rule input by the second user includes a value for each of the one or more columns representing the rule condition and for each of the one or more columns representing the rule action.

* * * * *